US010127912B2

(12) United States Patent
Yliaho et al.

(10) Patent No.: US 10,127,912 B2
(45) Date of Patent: Nov. 13, 2018

(54) ORIENTATION BASED MICROPHONE SELECTION APPARATUS

(71) Applicant: Nokia Technologies Oy, Espoo (FI)

(72) Inventors: Marko Tapani Yliaho, Tampere (FI); Ari Juhani Koski, Lempäälä (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/649,013

(22) PCT Filed: Dec. 10, 2012

(86) PCT No.: PCT/EP2012/074956
§ 371 (c)(1),
(2) Date: Jun. 2, 2015

(87) PCT Pub. No.: WO2014/090277
PCT Pub. Date: Jun. 19, 2014

(65) Prior Publication Data
US 2015/0317981 A1 Nov. 5, 2015

(51) Int. Cl.
*H04R 5/00* (2006.01)
*H04R 29/00* (2006.01)
*H04B 1/00* (2006.01)
*G10L 19/00* (2013.01)
*H04R 5/027* (2006.01)
*H04S 7/00* (2006.01)
*H04R 1/40* (2006.01)
(Continued)

(52) U.S. Cl.
CPC .............. *G10L 19/00* (2013.01); *H04R 5/027* (2013.01); *H04S 7/30* (2013.01); *H04S 7/40* (2013.01); *H04R 1/406* (2013.01); *H04R 3/005* (2013.01); *H04R 2201/401* (2013.01); *H04S 3/006* (2013.01); *H04S 2400/15* (2013.01)

(58) Field of Classification Search
CPC .... H04R 1/406; H04R 3/005; H04R 2499/11; H04R 2203/12; H04R 5/027; H04S 1/00; G10L 19/00
USPC ........ 381/26, 119, 17, 58; 704/276; 386/201
See application file for complete search history.

(56) References Cited

U.S. PATENT DOCUMENTS 5,477,270 A 12/1995 Park
5,594,800 A 1/1997 Gerzon
(Continued)

FOREIGN PATENT DOCUMENTS

EP 1592008 A2 11/2005
EP 2059066 A1 5/2009
(Continued)

OTHER PUBLICATIONS

"Capturing Multiple Audio Channels", Final Cut Pro 7, Retrieved on Jun. 8, 2015, Webpage available at : http://documentation.apple.com/en/finalcutpro/usermanual/index.html#chapter=19%26section=3%26tasks=true.
(Continued)

*Primary Examiner* — Thjuan K Addy
(74) *Attorney, Agent, or Firm* — Harrington & Smith

(57) ABSTRACT

An apparatus comprising: an input configured to receive from at least two microphones at least two audio signals; at least two processor instances configured to generate separate output audio signal tracks from the at least two audio signals from the at least two microphones; a file processor configured to link the at least two output audio signal tracks within a file structure.

20 Claims, 20 Drawing Sheets

(51) Int. Cl.
*H04R 3/00* (2006.01)
*H04S 3/00* (2006.01)

(56) References Cited

U.S. PATENT DOCUMENTS

| | | | | |
|---|---|---|---|---|
| 6,421,447 | B1 | 7/2002 | Chu | |
| 2008/0051920 | A1 | 2/2008 | Hori | |
| 2011/0013075 | A1 | 1/2011 | Kim et al. | |
| 2012/0195433 | A1 | 8/2012 | Eppolito et al. | |
| 2013/0226593 | A1* | 8/2013 | Magnusson | H04N 5/765<br>704/276 |
| 2014/0050454 | A1* | 2/2014 | Slotte | H04R 3/005<br>386/201 |

FOREIGN PATENT DOCUMENTS

| | | | |
|---|---|---|---|
| EP | 2129015 | A2 | 12/2009 |
| EP | 2146522 | A1 | 1/2010 |
| WO | 2012/031605 | A1 | 3/2012 |

OTHER PUBLICATIONS

"Recording Multiple Tracks", Homerecording.com, Retrieved on Jun. 8, 2015, Webpage available at : http://homerecording.com/bbs/general-discussions/newbies/recording-multiple-tracks-292151/.

"Tuaw Review: Wiretap Studio Shows Polish & Promise", Engadget, Retrieved on Jun. 8, 2015, Webpage available at : http://www.engadget.com/2007/12/20/tuaw-review-wiretap-studio-shows-polish-and-promise/.

International Search Report and Written Opinion received for corresponding Patent Cooperation Treaty Application No. PCT/EP2012/074956, dated May 26, 2014, 19 pages.

"Soudtrack Pro 3", Apple Inc, User Manual, 2009, 542 pages.

* cited by examiner

ORIENTATION BASED MICROPHONE SELECTION APPARATUS

RELATED APPLICATION

This application was originally filed as Patent Cooperation Treaty Application No. PCT/EP2012/074956 filed Dec. 10, 2012.

FIELD

The present application relates to apparatus for spatial audio signal processing. The invention further relates to, but is not limited to, apparatus for spatial audio signal processing within mobile devices.

BACKGROUND

Spatial audio signals are being used in greater frequency to produce a more immersive audio experience. A stereo or multi-channel recording can be passed from the recording or capture apparatus to a listening apparatus and replayed using a suitable multi-channel output such as a multi-channel loudspeaker arrangement and with virtual surround processing a pair of stereo headphones or headset.

It would be understood that in the near future it will be possible for mobile apparatus such as mobile phone to have more than two microphones. This offers the possibility to record real multichannel audio. With advanced signal processing it is further possible to beamform or directionally amplify or process the audio signal from the microphones from a specific or desired direction.

Furthermore certain video file formats such as MP4 allow for the MP4 container to comprise multiple audio signal tracks and video encoded signals. Thus it is possible to record multiple surround sound tracks with different beams (or multiple stereo tracks) and with different settings or capture object-based audio signals.

SUMMARY

Aspects of this application thus provide a spatial audio capture and processing whereby listening orientation or video and audio capture orientation differences can be compensated for.

According to a first aspect there is provided an apparatus comprising: an input configured to receive from at least two microphones at least two audio signals; at least two processor instances configured to generate separate output audio signal tracks from the at least two audio signals from the at least two microphones; a file processor configured to link the at least two output audio signal tracks within a file structure.

The at least one of the at least two processor instances may comprise: a surround sound processor instance configured to output a multichannel output audio signal track; a stereo sound processor instance configured to output a stereo output audio signal track; a mono sound processor instance configured to output a mono output audio signal track; and an audio object processor instance configured to output an audio object output audio track.

The apparatus may further comprise at least one mixer configured to receive at least two output audio signal tracks and generate at least one combined output audio signal track, wherein the file processor is configured to link the least one combined output audio signal track with at least one other track.

The apparatus may further comprise at least one encoder configured to receive at least one output audio signal track and generate at least one encoded output audio signal track, wherein the file processor is further configured to link the least one encoded output audio signal track with at least one other track.

The apparatus may further comprise a pre-processor configured to receive the at least two audio signals, and generate at least two audio signals to be passed to the at least one processor instance.

The pre-processor may comprise at least one of: an equaliser configured to equalise each of the at least two audio signals from the at least two microphones, so to compensate for any manufacturing differences in the at least two microphones; a wind noise reducer configured to reduce the wind noise of the at least two audio signals from the at least two microphones; a handling noise reducer configured to reduce the handling noise of the at least two audio signals from the at least two microphones; dynamic range compressor configured to dynamically range compress the at least two audio signals from the at least two microphones; sample rate converter configured to convert the sampling rate of the at least two audio signals from the at least two microphones; a word length resolution modifier configured to change the word length resolution of the at least two audio signals from the at least two microphones; and a blockage processor configured to determine and compensate for a fault or blockage in at least one of the at least two microphones.

At least one of the at least two processor instances configured to generate separate output audio signal tracks from the at least two audio signals from the at least two microphones may comprise at least one of: a upmixer configured to generate an audio signal track with more channels than the number of input audio signals; a downmixer configured to generate an audio signal track with fewer channels than the number of input audio signals; a signal source analyser configured to determine the orientation of at least one signal source relative to the apparatus from the at least two audio signals from the at least two microphones; a signal source processor configured to modify the orientation of at least one signal source relative to the apparatus; a spatial processor configured to generate a spatial processing of the at least two audio signals from the at least two microphones; and a mapper configured to map the at least two audio signals from the at least two microphones to a output multichannel audio signal track.

The spatial processor may comprise at least one of: an audio focuser configured to generate a spatially focussed audio signal from the at least two audio signals from the at least two microphones; an audio zoomer configured to generate a spatially expanded audio signal from the at least two audio signals from the at least two microphones; a directional defined audio amplifier configured to amplify within a defined directional range the at least two audio signals from the at least two microphones; a directional defined audio attenuator configured to attenuate within a defined directional range the at least two audio signals from the at least two microphones; an audio de-emphasiser configured to apply a reverberation within a defined directional range the at least two audio signals from the at least two microphones; an audio source displacer configured to modify a relative orientation of an audio source by a defined displacement angle; and a directionally defined audio filter configured to spatially filter within a defined directional range the at least two audio signals from the at least two microphones.

The apparatus may further comprising a camera configured to generate a video format signal, wherein the file processor configured to link the at least two output audio signal tracks within a file structure may be configured to generate a data structure linking the at least two output audio signal tracks with the video format signal.

The file processor may be configured to generate a mp4 format file structure comprising the at least two audio signal tracks as separate tracks linked in a mp4 format file structure description.

The apparatus may further comprise at least two microphones configured to generate the at least two audio signals.

The apparatus may further comprise a user interface input configured to configure at least one of the at least two processor instances.

The user interface input may comprise at least one of: a radio-button selection configured to select one processor instance template from a plurality of processor instance templates to be applied to at least one of the two processor instances; a selection-box selection configured to select one or more processor instance templates from a plurality of processor instance templates to be applied to the two processor instances; a track selection-box selection configured to select one or more processor instance templates from a plurality of processor instance templates for each of one or more processor instances; a channel selection configured to select the number of channels output by at least one of the two processor instances; an audio region selection configured to determine a spatial region within which at least one of the two processor instances applies spatial processing; a surround channel selection configured to select a surround sound instance template to be applied to at least one of the two processor instances; a surround channel option selection configured to select one surround sound processor instance template from a plurality of surround sound processor instance templates to be applied to at least one of the two processor instances; an object track selection configured to select an object instance template to be applied to at least one of the two processor instances; and an object number selection configured to select an object instance template comprising a filter configured to select a number of objects to be applied to at least one of the two processor instances.

According to a second aspect there is provided an apparatus comprising at least one processor and at least one memory including computer code for one or more programs, the at least one memory and the computer code configured to with the at least one processor cause the apparatus to at least: receive from at least two microphones at least two audio signals; generate separate output audio signal tracks from the at least two audio signals from the at least two microphones; and link the at least two output audio signal tracks within a file structure.

Generating separate output audio signal tracks from the at least two audio signals from the at least two microphones may cause the apparatus to perform one of: output a multichannel output audio signal track; output a stereo output audio signal track; output a mono output audio signal track; and output an audio object output audio track.

The apparatus may be further caused to receive at least two output audio signal tracks and generate at least one combined output audio signal track.

The apparatus may be further caused to receive at least one output audio signal track and generate at least one encoded output audio signal track.

The apparatus may be further caused to receive the at least two audio signals, and process the at least two audio signals to be passed to the at least one processor instance.

The processing of the at least two audio signals may cause the apparatus to perform at least one of: equalise each of the at least two audio signals from the at least two microphones, so to compensate for any manufacturing differences in the at least two microphones; reduce the wind noise of the at least two audio signals from the at least two microphones; reduce the handling noise of the at least two audio signals from the at least two microphones; dynamically range compress the at least two audio signals from the at least two microphones; convert the sampling rate of the at least two audio signals from the at least two microphones; change the word length resolution of the at least two audio signals from the at least two microphones; and determine and compensate for a fault or blockage in at least one of the at least two microphones.

Generating separate output audio signal tracks from the at least two audio signals from the at least two microphones may cause the apparatus to perform at least one of: generate an audio signal track with more channels than the number of input audio signals; generate an audio signal track with fewer channels than the number of input audio signals; determine the orientation of at least one signal source relative to the apparatus from the at least two audio signals from the at least two microphones; modify the orientation of at least one signal source relative to the apparatus; generate a spatial processing of the at least two audio signals from the at least two microphones; and map the at least two audio signals from the at least two microphones to a output multichannel audio signal track.

Generating a spatial processing of the at least two audio signals from the at least two microphones may cause the apparatus to perform at least one of: generate a spatially focussed audio signal from the at least two audio signals from the at least two microphones; generate a spatially expanded audio signal from the at least two audio signals from the at least two microphones; amplify within a defined directional range the at least two audio signals from the at least two microphones; attenuate within a defined directional range the at least two audio signals from the at least two microphones; apply a reverberation within a defined directional range the at least two audio signals from the at least two microphones; modify a relative orientation of an audio source by a defined displacement angle; and spatially filter within a defined directional range the at least two audio signals from the at least two microphones.

The apparatus may be further caused to generate a video format signal, wherein linking the at least two output audio signal tracks within a file structure causes the apparatus to generate a data structure linking the at least two output audio signal tracks with the video format signal.

Linking the at least two output audio signal tracks within a file structure may cause the apparatus to generate a mp4 format file structure comprising the at least two audio signal tracks as separate tracks linked in a mp4 format file structure description.

The apparatus may comprise at least two microphones configured to generate the at least two audio signals.

The apparatus may further be caused to configure at least one of the at least two processor instances based on a user interface input.

Configuring at least one of the at least two processor instances based on a user interface input may cause the apparatus to perform at least one of: select one processor instance template from a plurality of processor instance templates to be applied to at least one of the two processor instances; select one or more processor instance templates from a plurality of processor instance templates to be applied to the two processor instances; select one or more processor instance templates from a plurality of processor instance templates for each of one or more processor instances; select the number of channels output by at least one of the two processor instances; determine a spatial region within which at least one of the two processor instances applies spatial processing; select a surround sound instance template to be applied to at least one of the two processor instances; select one surround sound processor instance template from a plurality of surround sound processor instance templates to be applied to at least one of the two processor instances; select an object instance template to be applied to at least one of the two processor instances; and select an object instance template comprising a filter configured to select a number of objects to be applied to at least one of the two processor instances.

According to a third aspect there is provided an apparatus comprising: means for receiving from at least two microphones at least two audio signals; means for generating separate output audio signal tracks from the at least two audio signals from the at least two microphones; and means for linking the at least two output audio signal tracks within a file structure.

The means for generating separate output audio signal tracks from the at least two audio signals from the at least two microphones may comprise at least one of: means for outputting a multichannel output audio signal track; means for outputting a stereo output audio signal track; means for outputting a mono output audio signal track; and means for outputting an audio object output audio track.

The apparatus may further comprise means for combining at least two output audio signal tracks to generate at least one combined output audio signal track.

The apparatus may further comprise means for encoding at least one output audio signal track to generate at least one encoded output audio signal track.

The apparatus may further comprise means for processing the at least two audio signals to be passed to the at least one processor instance.

The means for processing the at least two audio signals may comprise at least one of: means for equalising each of the at least two audio signals from the at least two microphones, so to compensate for any manufacturing differences in the at least two microphones; means for reducing the wind noise of the at least two audio signals from the at least two microphones; means for reducing the handling noise of the at least two audio signals from the at least two microphones; means for dynamically range compressing the at least two audio signals from the at least two microphones; means for converting the sampling rate of the at least two audio signals from the at least two microphones; means for changing the word length resolution of the at least two audio signals from the at least two microphones; and means for determining and compensating for a fault or blockage in at least one of the at least two microphones.

The means for generating separate output audio signal tracks from the at least two audio signals from the at least two microphones may comprise at least one of: means for generating an audio signal track with more channels than the number of input audio signals; means for generating an audio signal track with fewer channels than the number of input audio signals; means for determining the orientation of at least one signal source relative to the apparatus from the at least two audio signals from the at least two microphones; means for modifying the orientation of at least one signal source relative to the apparatus; means for generating a spatial processing of the at least two audio signals from the at least two microphones; and means for mapping the at least two audio signals from the at least two microphones to a output multichannel audio signal track.

The means for generating a spatial processing of the at least two audio signals from the at least two microphones may comprise at least one of: means for generating a spatially focussed audio signal from the at least two audio signals from the at least two microphones; means for generating a spatially expanded audio signal from the at least two audio signals from the at least two microphones; means for amplifying within a defined directional range the at least two audio signals from the at least two microphones; means for attenuating within a defined directional range the at least two audio signals from the at least two microphones; means for applying a reverberation within a defined directional range the at least two audio signals from the at least two microphones; and means for modifying a relative orientation of an audio source by a defined displacement angle; and spatially filter within a defined directional range the at least two audio signals from the at least two microphones.

The apparatus may further comprise means for generating a video format signal, wherein the means for linking the at least two output audio signal tracks within a file structure comprises means for generating a data structure linking the at least two output audio signal tracks with the video format signal.

The means for linking the at least two output audio signal tracks within a file structure may comprise means for generating a mp4 format file structure comprising the at least two audio signal tracks as separate tracks linked in a mp4 format file structure description.

The apparatus may comprise at least two microphones configured to generate the at least two audio signals.

The apparatus may further comprise means for configuring at least one of the at least two processor instances based on a user interface input.

The means for configuring at least one of the at least two processor instances based on a user interface input may comprise at least one of: means for selecting one processor instance template from a plurality of processor instance templates to be applied to at least one of the two processor instances; means for selecting one or more processor instance templates from a plurality of processor instance templates to be applied to the two processor instances; means for selecting one or more processor instance templates from a plurality of processor instance templates for each of one or more processor instances; means for selecting the number of channels output by at least one of the two processor instances; means for determining a spatial region within which at least one of the two processor instances applies spatial processing; means for selecting a surround sound instance template to be applied to at least one of the two processor instances; means for selecting one surround sound processor instance template from a plurality of surround sound processor instance templates to be applied to at least one of the two processor instances; means for selecting an object instance template to be applied to at least one of the two processor instances; and means for selecting an object instance template comprising a filter configured to select a number of objects to be applied to at least one of the two processor instances.

According to a fourth aspect there is provided a method comprising: receiving from at least two microphones at least two audio signals; generating separate output audio signal tracks from the at least two audio signals from the at least two microphones; and linking the at least two output audio signal tracks within a file structure.

Generating separate output audio signal tracks from the at least two audio signals from the at least two microphones may comprise at least one of: outputting a multichannel output audio signal track; outputting a stereo output audio signal track; means for outputting a mono output audio signal track; and outputting an audio object output audio track.

The method may further comprise combining at least two output audio signal tracks to generate at least one combined output audio signal track.

The method may further comprise encoding at least one output audio signal track to generate at least one encoded output audio signal track.

The method may further comprise processing the at least two audio signals to be passed to the at least one processor instance.

Processing the at least two audio signals may comprise at least one of: equalising each of the at least two audio signals from the at least two microphones, so to compensate for any manufacturing differences in the at least two microphones; reducing the wind noise of the at least two audio signals from the at least two microphones; reducing the handling noise of the at least two audio signals from the at least two microphones; dynamically range compressing the at least two audio signals from the at least two microphones; converting the sampling rate of the at least two audio signals from the at least two microphones; changing the word length resolution of the at least two audio signals from the at least two microphones; and determining and compensating for a fault or blockage in at least one of the at least two microphones.

Generating separate output audio signal tracks from the at least two audio signals from the at least two microphones may comprise at least one of: generating an audio signal track with more channels than the number of input audio signals; generating an audio signal track with fewer channels than the number of input audio signals; determining the orientation of at least one signal source relative to the apparatus from the at least two audio signals from the at least two microphones; modifying the orientation of at least one signal source relative to the apparatus; generating a spatial processing of the at least two audio signals from the at least two microphones; and mapping the at least two audio signals from the at least two microphones to a output multichannel audio signal track.

Generating a spatial processing of the at least two audio signals from the at least two microphones may comprise at least one of: generating a spatially focussed audio signal from the at least two audio signals from the at least two microphones; generating a spatially expanded audio signal from the at least two audio signals from the at least two microphones; amplifying within a defined directional range the at least two audio signals from the at least two microphones; attenuating within a defined directional range the at least two audio signals from the at least two microphones; applying a reverberation within a defined directional range the at least two audio signals from the at least two microphones; and modifying a relative orientation of an audio source by a defined displacement angle; and spatially filter within a defined directional range the at least two audio signals from the at least two microphones.

The method may further comprise generating a video format signal, wherein linking the at least two output audio signal tracks within a file structure comprises generating a data structure linking the at least two output audio signal tracks with the video format signal.

Linking the at least two output audio signal tracks within a file structure may comprise generating a mp4 format file structure comprising the at least two audio signal tracks as separate tracks linked in a mp4 format file structure description.

The method may further comprise configuring at least one of the at least two processor instances based on a user interface input.

Configuring at least one of the at least two processor instances based on a user interface input may comprise at least one of: selecting one processor instance template from a plurality of processor instance templates to be applied to at least one of the two processor instances; selecting one or more processor instance templates from a plurality of processor instance templates to be applied to the two processor instances; selecting one or more processor instance templates from a plurality of processor instance templates for each of one or more processor instances; selecting the number of channels output by at least one of the two processor instances; determining a spatial region within which at least one of the two processor instances applies spatial processing; selecting a surround sound instance template to be applied to at least one of the two processor instances; selecting one surround sound processor instance template from a plurality of surround sound processor instance templates to be applied to at least one of the two processor instances; selecting an object instance template to be applied to at least one of the two processor instances; and selecting an object instance template comprising a filter configured to select a number of objects to be applied to at least one of the two processor instances.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For better understanding of the present application, reference will now be made by way of example to the accompanying drawings in which.

EMBODIMENTS

Figure 1:
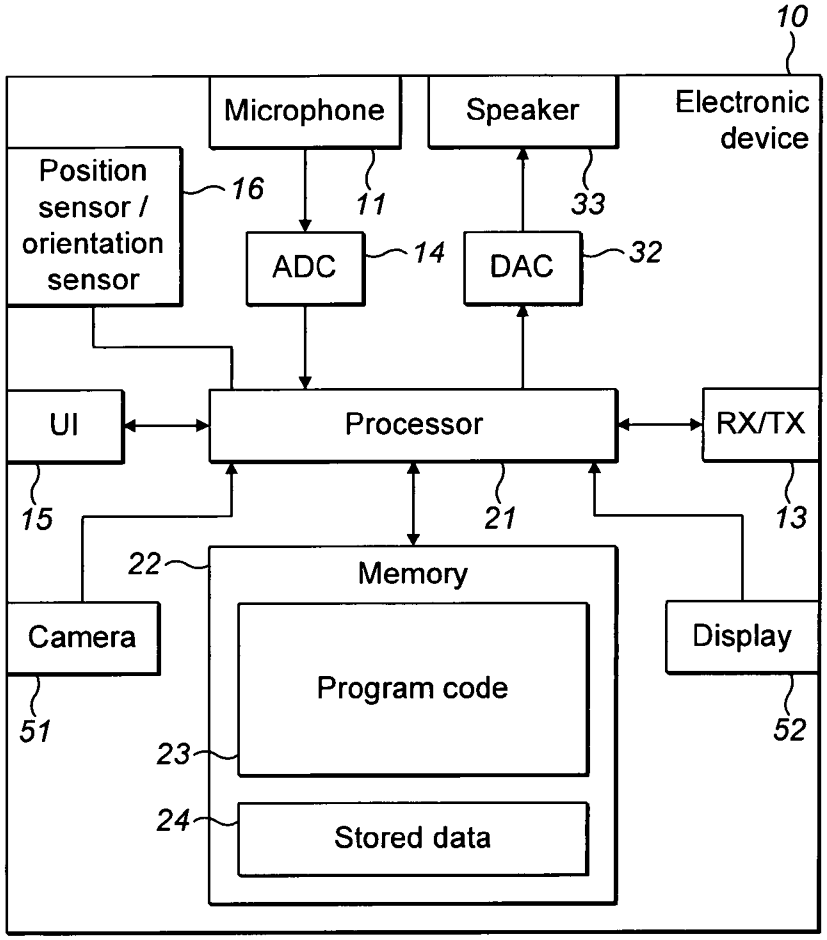
FIG. 1 shows schematically an apparatus suitable for being employed in some embodiments.

The following describes in further detail suitable apparatus and possible mechanisms for the provision of effective orientation or directional processing of audio recording for example within audio-video capture apparatus. In the following examples audio signals and processing is described. However it would be appreciated that in some embodiments the audio signal/audio capture and processing is a part of an audio-video system.

As described herein mobile devices or apparatus are more commonly being equipped with multiple microphone configurations or microphone arrays suitable for recording or capturing the audio environment or audio scene surrounding the mobile device or apparatus. This microphone configuration thus enables the possible recording of stereo or surround sound signals. Furthermore the known location and orientation of the microphones further enables the apparatus to process the captured or recorded audio signals from the microphones to perform spatial processing to emphasise or focus on the audio signals from a defined direction relative to other directions.

However in performing real time processing of the audio signal there are problems in the current implementations of audio processing. For example typically the audio signal recorded by the apparatus is defined with respect to a fixed forward beam or no beam at all.

Where there is no beam at all, everything around the apparatus is recorded and the user is unable to restrict what is being recorded. However this can result in the most dominant audio sources swamping other audio sources, and sometimes the most dominant audio source is not the most interesting for the user to record. For example a museum exhibit may be being shown next to a louder exhibit and the louder exhibit prevents the quieter exhibit being recorded.

Where the beam is fixed forward then only the audio sources approximately in line with the apparatus are recorded, which can be problematic where user wishes to redirect the audio at a later date (for example in any post processing operation). Furthermore fixed beam processing has limitations in that everything from that direction such as the front is recorded and then the user is unable to restrict or choose what is recorded. Also in some cases what happens directly in the front is not always the most interesting audio. For example the museum exhibit itself may not be the interesting audio source but rather a guide standing to one side of the exhibit or moving around the exhibit. A fixed or fixed forward processing would prevent the recording of the video of the exhibit and the recording of the audio of the guide explaining the exhibit.

The concept of embodiments is therefore to flexibly capture or record multiple audio tracks with different channel configurations. For example the channel configurations can be mono/stereo/surround sound/object processed audio signals and can have various settings. For example one part of the concept covers forming multiple instances (or elements) of processed audio signals (for example beams) for surround sound in real time recording or embedding these within a video.

In the embodiments as described herein an apparatus or device comprising two or more microphones can generate these processing elements or instances and encode the output of the processing elements or instances separately.

Furthermore as described hereafter in some embodiments complex processing instances can in some embodiments be generated by combining the output of the processing elements or instances and encoding the combination output.

In some embodiments the elements or instances can be multichannel (or surround sound) processed outputs, or can be stereo processed outputs or mono processed outputs or audio object processed outputs.

In this regard reference is first made to FIG. 1 which shows a schematic block diagram of an exemplary apparatus or electronic device 10, which may be used to record (or operate as a capture apparatus).

The electronic device 10 may for example be a mobile terminal or user equipment of a wireless communication system when functioning as the recording apparatus or listening apparatus. In some embodiments the apparatus can be an audio player or audio recorder, such as an MP3 player, a media recorder/player (also known as an MP4 player), or any suitable portable apparatus suitable for recording audio or audio/video camcorder/memory audio or video recorder.

The apparatus 10 can in some embodiments comprise an audio-video subsystem. The audio-video subsystem for example can comprise in some embodiments a microphone or array of microphones 11 for audio signal capture. In some embodiments the microphone or array of microphones can be a solid state microphone, in other words capable of capturing audio signals and outputting a suitable digital format signal. In some other embodiments the microphone or array of microphones 11 can comprise any suitable microphone or audio capture means, for example a condenser microphone, capacitor microphone, electrostatic microphone, Electret condenser microphone, dynamic microphone, ribbon microphone, carbon microphone, piezoelectric microphone, or micro electrical-mechanical system (MEMS) microphone. In some embodiments the microphone 11 is a digital microphone array, in other words configured to generate a digital signal output (and thus not requiring an analogue-to-digital converter). The microphone 11 or array of microphones can in some embodiments output the audio captured signal to an analogue-to-digital converter (ADC) 14.

In some embodiments the apparatus can further comprise an analogue-to-digital converter (ADC) 14 configured to receive the analogue captured audio signal from the microphones and outputting the audio captured signal in a suitable digital form. The analogue-to-digital converter 14 can be any suitable analogue-to-digital conversion or processing means. In some embodiments the microphones are 'integrated' microphones containing both audio signal generating and analogue-to-digital conversion capability.

In some embodiments the apparatus 10 audio-video subsystem further comprises a digital-to-analogue converter 32 for converting digital audio signals from a processor 21 to a suitable analogue format. The digital-to-analogue converter (DAC) or signal processing means 32 can in some embodiments be any suitable DAC technology.

Furthermore the audio-video subsystem can comprise in some embodiments a speaker 33. The speaker 33 can in some embodiments receive the output from the digital-to-analogue converter 32 and present the analogue audio signal to the user. In some embodiments the speaker 33 can be representative of multi-speaker arrangement, a headset, for example a set of headphones, or cordless headphones.

In some embodiments the apparatus audio-video subsystem comprises a camera 51 or image capturing means configured to supply to the processor 21 image data. In some embodiments the camera can be configured to supply multiple images over time to provide a video stream.

In some embodiments the apparatus audio-video subsystem comprises a display 52. The display or image display means can be configured to output visual images which can be viewed by the user of the apparatus. In some embodiments the display can be a touch screen display suitable for supplying input data to the apparatus. the display can be any suitable display technology, for example the display can be implemented by a flat panel comprising cells of LCD, LED, OLED, or 'plasma' display implementations.

Although the apparatus 10 is shown having both audio/video capture and audio/video presentation components, it would be understood that in some embodiments the apparatus 10 can comprise one or the other of the audio capture and audio presentation parts of the audio subsystem such that in some embodiments of the apparatus the microphone (for audio capture) or the speaker (for audio presentation) are present. Similarly in some embodiments the apparatus 10 can comprise one or the other of the video capture and video presentation parts of the video subsystem such that in some embodiments the camera 51 (for video capture) or the display 52 (for video presentation) is present.

In some embodiments the apparatus 10 comprises a processor 21. The processor 21 is coupled to the audio-video subsystem and specifically in some examples the analogue-to-digital converter 14 for receiving digital signals representing audio signals from the microphone 11, the digital-to-analogue converter (DAC) 12 configured to output processed digital audio signals, the camera 51 for receiving digital signals representing video signals, and the display 52 configured to output processed digital video signals from the processor 21.

The processor 21 can be configured to execute various program codes. The implemented program codes can comprise for example audio-video recording and audio-video presentation routines. In some embodiments the program codes can be configured to perform audio signal modelling or spatial audio signal processing.

In some embodiments the apparatus further comprises a memory 22. In some embodiments the processor is coupled to memory 22. The memory can be any suitable storage means. In some embodiments the memory 22 comprises a program code section 23 for storing program codes implementable upon the processor 21. Furthermore in some embodiments the memory 22 can further comprise a stored data section 24 for storing data, for example data that has been encoded in accordance with the application or data to be encoded via the application embodiments as described later. The implemented program code stored within the program code section 23, and the data stored within the stored data section 24 can be retrieved by the processor 21 whenever needed via the memory-processor coupling.

In some further embodiments the apparatus 10 can comprise a user interface 15. The user interface 15 can be coupled in some embodiments to the processor 21. In some embodiments the processor can control the operation of the user interface and receive inputs from the user interface 15. In some embodiments the user interface 15 can enable a user to input commands to the electronic device or apparatus 10, for example via a keypad, and/or to obtain information from the apparatus 10, for example via a display which is part of the user interface 15. The user interface 15 can in some embodiments as described herein comprise a touch screen or touch interface capable of both enabling information to be entered to the apparatus 10 and further displaying information to the user of the apparatus 10.

In some embodiments the apparatus further comprises a transceiver 13, the transceiver in such embodiments can be coupled to the processor and configured to enable a communication with other apparatus or electronic devices, for example via a wireless communications network. The transceiver 13 or any suitable transceiver or transmitter and/or receiver means can in some embodiments be configured to communicate with other electronic devices or apparatus via a wire or wired coupling.

The transceiver 13 can communicate with further apparatus by any suitable known communications protocol, for example in some embodiments the transceiver 13 or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

In some embodiments the apparatus comprises a position sensor 16 configured to estimate the position of the apparatus 10. The position sensor 16 can in some embodiments be a satellite positioning sensor such as a GPS (Global Positioning System), GLONASS or Galileo receiver.

In some embodiments the positioning sensor can be a cellular ID system or an assisted GPS system.

In some embodiments the apparatus 10 further comprises a direction or orientation sensor. The orientation/direction sensor can in some embodiments be an electronic compass, accelerometer, and a gyroscope or be determined by the motion of the apparatus using the positioning estimate.

It is to be understood again that the structure of the electronic device 10 could be supplemented and varied in many ways.

Figure 2:
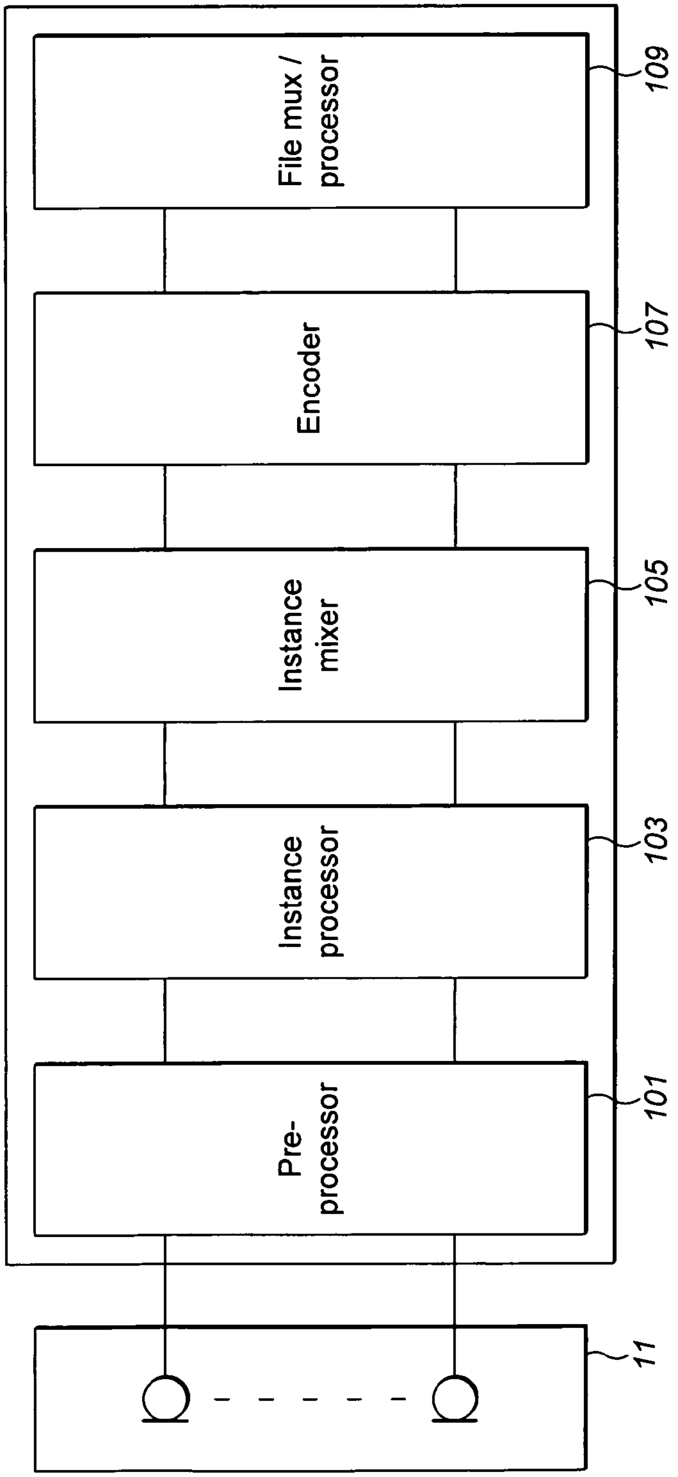
FIG. 2 shows schematically an example spatial audio signal processing apparatus according to some embodiments.

With respect to FIG. 2, an example spatial audio signal processing apparatus according to some embodiments is shown. Furthermore with respect to FIG. 3 a flow diagram of the operation of the spatial audio signal processing apparatus as shown in FIG. 2 is shown.

In some embodiments the apparatus comprises the microphone or array of microphones 11 which are configured to capture or record the acoustic waves and generate an audio signal for each microphone which is passed to the spatial audio signal processing apparatus. As described herein in some embodiments the microphones 11 are configured to output an analogue signal which is converted into a digital format by the analogue to digital converter (ADC) 14. However in some embodiments the microphones are integrated microphones configured to output a digital format signal. Furthermore in some embodiments the microphone array is physically separate from the apparatus, for example the microphone array can be located on a headset (where the headset also has an associated video camera capturing the video images which can also be passed to the apparatus and processed in a manner to generate an encoded video signal which can incorporate the processed audio signals as described herein) which wirelessly or otherwise passes the audio signals to the apparatus for processing.

Figure 3:
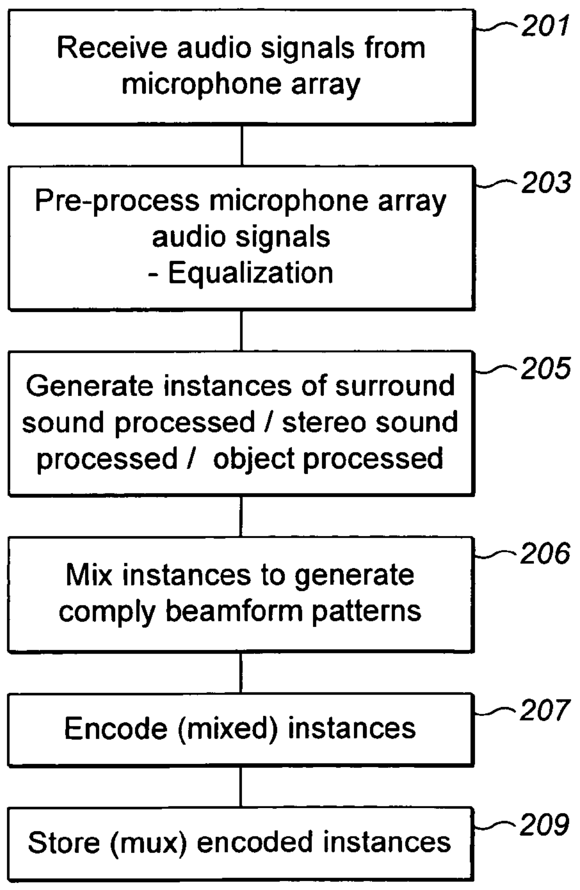
FIG. 3 shows schematically a flow diagram of the operation of the spatial audio signal processing apparatus shown in FIG. 2 according to some embodiments.

The operation of receiving the audio signals from the microphone array is shown in FIG. 3 by step 201.

In some embodiments the spatial audio signal processing apparatus comprises a pre-processor 101. The pre-processor is configured to receive the audio signals from the microphones and process these to generate audio signals to be used in the processing instances. For example in some embodiments the pre-processor can be configured to equalise the audio signals. However any suitable processing of the audio signals to enable them to be compared can be performed such as microphone damage or blockage processing. Examples of pre-processing that can in some embodiments be applied are: a wind noise reducer configured to reduce the wind noise of the audio signals from the microphones; a handling noise reducer configured to reduce the handling noise of the audio signals from the microphones; a dynamic range compressor configured to dynamically range compress the audio signals from the microphones; a sample rate converter configured to convert the sampling rate of the audio signals from the microphones; and a word length resolution modifier configured to change the word length resolution of the audio signals from the microphones.

The operation of pre-processing the microphone array audio signals (for example equalisation) is shown in FIG. 3 by step 203.

In some embodiments the pre-processed audio signals from each of the microphones are then passed to an instance processor 103.

In some embodiments the spatial audio signal processing apparatus comprises an instance processor 103. The instance processor 103 comprises at least one processing instance, for example at least one instance of surround sound processing, stereo processing, mono processing or object processing.

The instance processor 103 is configured to utilise the multiple microphone input and from the audio signals from the multiple microphone input analyse the directions of separate audio or sound sources. Furthermore the instance processor 103 can then be configured to process these audio or sound sources, for example to map or synthesise the sounds according to their direction of arrival information into a target multichannel audio reproduction configuration.

For example in some embodiments the target multichannel audio reproduction configuration can be a surround sound 5.1 speaker system. In some embodiments the surround sound or multichannel audio reproduction configuration can be any suitable channel number or arrangement configuration.

Furthermore as described herein the instance processor 103 can be configured to output a mono, stereo, or object-based parameter processed output.

For example in some embodiments as described herein the mapping is performed by applying a suitable head related transfer function (HRTF) to the identified audio or sound source.

In some embodiments a minimum number of microphones are required to perform proper direction recognition. For example in some embodiments a minimum of three microphones in a triangle configuration towards the recording direction are required to get an accurate estimation of the direction.

In some embodiments audio sounds or signals which have no clear direction can be mapped to an ambience location, for example mapped to any set or combination of front, subwoofer and surround channels. In some embodiments the mapping is to the surround channels but also a mapping to all channels can be implemented in some embodiments.

In some embodiments the instance processor 103 can be configured to further perform surround processing or general processing with respect to a desired direction or section or range of directions. In other words the instance processor 103 can be configured to receive a user input indicating a desired direction or range of directions and then process the audio signals from the microphones to provide a processed audio signal having an audio focus or zoom in the desired direction or range of directions. The audio focus or zoom processing in some embodiments can be amplification (for example of signals from the desired direction), attenuation (for example of signals from directions other than the desired direction), audio zooming, deemphasising, audio source moving, or filtering. For example in some embodiments the instance processor is configured to generate a focussed audio signal by amplifying audio signals from within a defined direction or region, and attenuating audio signals from outside the defined direction or region. This approach is also known as beamforming. The amplification and attenuation of the audio signals in some embodiments can be defined as a directionally defined audio filter (or spatial audio filter) configured to spatially filter within a defined directional range the audio signals. In some embodiments the spatial filter can be configured to be frequency as well as spatially specific, in other words be configured to filter in both spatial and frequency domains.

In some embodiments the instance processor can be configured to generate a direction or region defined audio signal amplification configured to amplify within a defined directional range the audio signals for example from the at least two microphones. In other words to amplify audio signals from a defined direction or region but not affect the other audio sources/signals outside of the defined direction or region.

In some embodiments the instance processor can be configured to generate a direction or region defined audio signal attenuation configured to attenuate within a defined directional range the audio signals, for example from the at least two microphones. In other words to attenuate or nullify audio signals from a defined direction or region but not affect the other audio sources/signals outside of the defined direction or region.

In some embodiments the instance processor is configured to generate a focussed audio signal by generating a spatially expanded audio signal from the at least two audio signals from the at least two microphones, in other words audio sources from within a defined region can be artificially separated from each other and audio sources outside of the defined region are artificially moved closer together. This approach can produce the effect of producing noticeable audio separation between close audio sources within the defined region while 'merging' the audio sources outside of the defined region.

In some embodiments the instance processor can be configured to operate as an 'audio de-emphasiser' configured to apply a reverberation within a defined directional range to any audio source or signals within the region or direction. The reverberation can be experienced by the listener as the sound source or audio signals becoming 'background' or muffled.

In some embodiments the instance processor can be configured to displace or move any determined audio sources. For example in some embodiments the instance processor can be configured to modify a relative orientation of an audio source by a defined displacement angle.

In some embodiments the instance processor 103 may be configured to generate multiple instances, where each instance is configured to perform different processing.

Although in the following examples each instance is shown with a separate analysis, processing and mapping stage it would be understood that in some embodiments different instances can utilise common elements. For example in some embodiments a common analysis part can be utilised by several parallel synthesis parts that produce the different processing outputs. Thus where there are two processing instances being generated by the instance processor 103, a first instance producing a first directional amplified output and a second instance providing an wider ambiance output, both of the instances could use the initial audio scene analysis which identifies or determines audio or sound sources rather than performing redundant analysis in each instance.

In some embodiments the actual audio source or sound source analysis can be a sub-bands analysis or determination.

The operation of generating instances of surround sound/stereo/mono/object instances is shown in FIG. 3 by step 205.

In some embodiments the output of the instance processor 103 is passed to an instance mixer 105.

In some embodiments the apparatus comprises an instance mixer 105 configured to receive at least a pair of instance processor 103 instance outputs and mix the instance outputs to generate a complex processed output.

The operation of mixing instances to generate complex instances is shown in FIG. 3 by step 206.

The instance mixer 105 can output the combined instance output to the encoder 107. Furthermore in some embodiments the instance processor 103 can be configured to output the processed instances to the encoder directly where no mixing is required.

In some embodiments the apparatus comprises an encoder 107. The encoder 107 can receive the output processed or mixed audio signals from the mixer 105, and the instance processor 103 and generate at least a single instance of encoder instance in order to encode the output audio signal. The encoder 107 can thus generate at least multiple encoding influences and perform the encoding in real time. The encoder 107 can be configured to output the encoding to a file multiplexer 109.

The operation of encoding the instance is shown in FIG. 3 by step 207.

In some embodiments the apparatus comprises a file multiplexer 109. The file multiplexer 109 is configured to receive the encoded audio signal from the encoder and multiplex these tracks or instances into a single file. For example in some embodiments the file can be a mp4 file containing video that has been recorded on the apparatus at the same time.

The operation of storing the encoded instances is shown in FIG. 3 by step 209.

Figure 4:
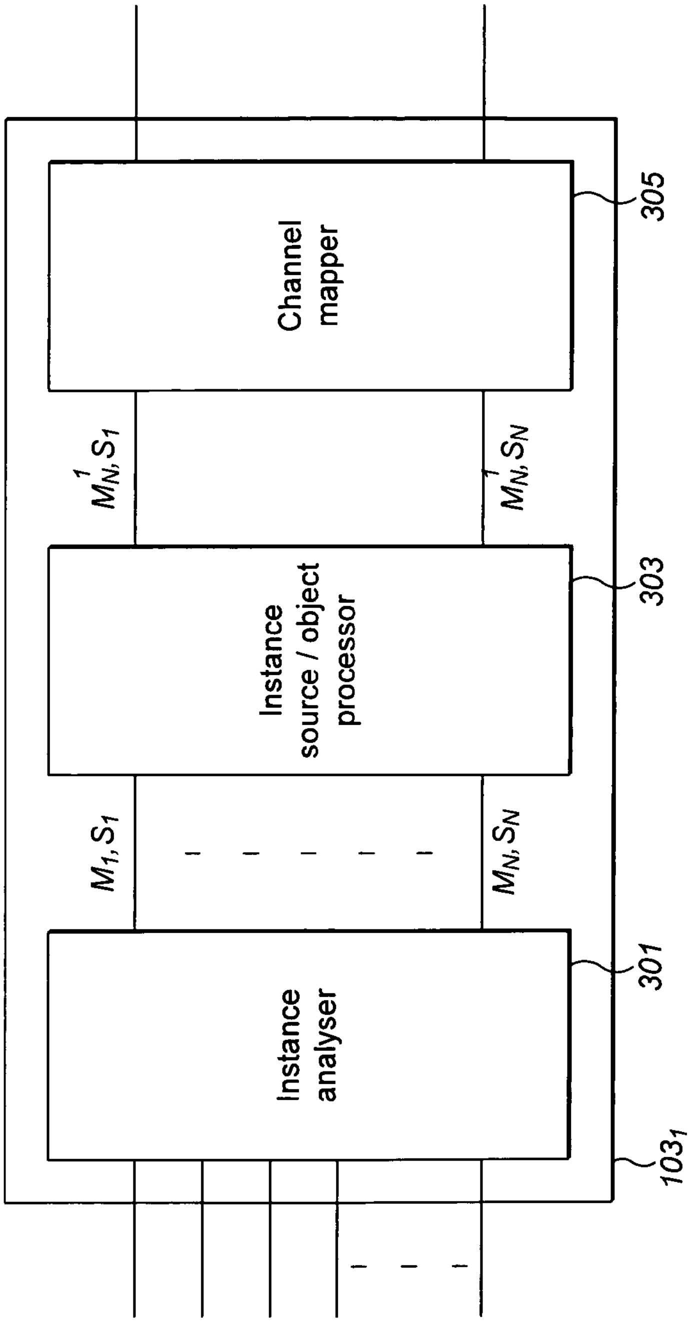
FIG. 4 shows schematically an example surround/stereo/object processor instance apparatus according to some embodiments.

With respect to FIG. 4 an example instance on the instance processor $\mathbf{103}_1$ is described in further detail. Furthermore with respect FIG. 5 the operation of the instance processor $\mathbf{103}_1$ shown in FIG. 4 is shown.

In some embodiments the instance processor 103 comprises an instance analyser 301. The instance analyser 301 is configured to receive the pre-processed multiple microphone inputs.

Figure 5:
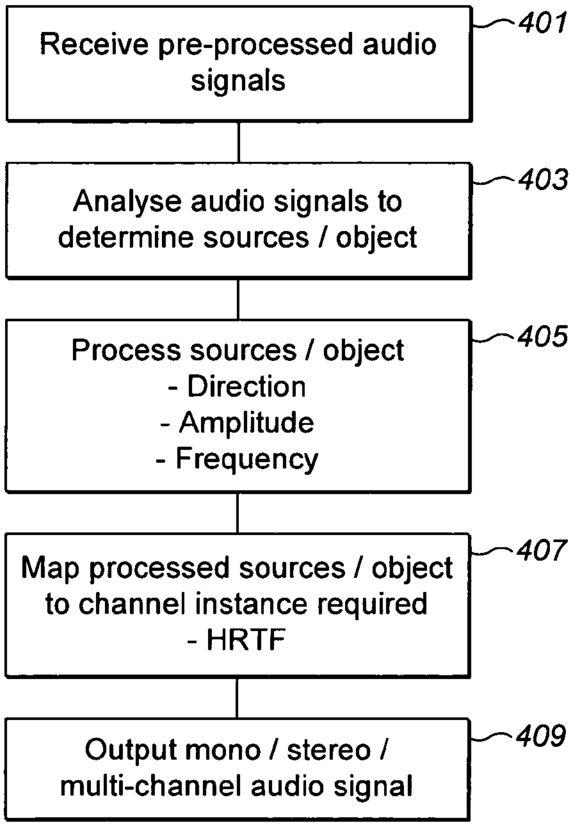
FIG. 5 shows schematically a flow diagram of the operation of the surround/stereo/object processor instance apparatus shown in FIG. 4 according to some embodiments.

The operation of receiving the pre-processed audio signal is shown in FIG. 5 by step 401.

The instance processor 103 furthermore can in some embodiments be configured to analyse the direction of the separate sound or audio sources (or objects) within the audio scene being recorded. In some embodiments the instance analyser 301 is configured to output the detected sources or objects to an instance source/object processor 303.

An example spatial analysis, determination of sources and parameterisation of the audio signal is described as follows. However it would be understood that any suitable audio signal spatial or directional analysis in either the time or other representational domain (frequency domain etc.) can be used.

In some embodiments the instance analyser 301 comprises a framer. The framer or suitable framer means can be configured to receive the audio signals from the microphones and divide the digital format signals into frames or groups of audio sample data. In some embodiments the framer can furthermore be configured to window the data using any suitable windowing function. The framer can be configured to generate frames of audio signal data for each microphone input wherein the length of each frame and a degree of overlap of each frame can be any suitable value. For example in some embodiments each audio frame is 20 milliseconds long and has an overlap of 10 milliseconds between frames. The framer can be configured to output the frame audio data to a Time-to-Frequency Domain Transformer.

In some embodiments the instance analyser 301 comprises a Time-to-Frequency Domain Transformer. The Time-to-Frequency Domain Transformer or suitable transformer means can be configured to perform any suitable time-to-frequency domain transformation on the frame audio data. In some embodiments the Time-to-Frequency Domain Transformer can be a Discrete Fourier Transformer (DFT). However the Transformer can be any suitable Transformer such as a Discrete Cosine Transformer (DCT), a Modified Discrete Cosine Transformer (MDCT), a Fast Fourier Transformer (FFT) or a quadrature mirror filter (QMF). The Time-to-Frequency Domain Transformer can be configured to output a frequency domain signal for each microphone input to a sub-band filter.

In some embodiments the instance analyser 301 comprises a sub-band filter. The sub-band filter or suitable means can be configured to receive the frequency domain signals from the Time-to-Frequency Domain Transformer for each microphone and divide each microphone audio signal frequency domain signal into a number of sub-bands.

The sub-band division can be any suitable sub-band division. For example in some embodiments the sub-band filter can be configured to operate using psychoacoustic filtering bands. The sub-band filter can then be configured to output each domain range sub-band to a direction analyser.

In some embodiments the instance analyser 301 can comprise a direction analyser. The direction analyser or suitable means can in some embodiments be configured to select a sub-band and the associated frequency domain signals for each microphone of the sub-band.

The direction analyser can then be configured to perform directional analysis on the signals in the sub-band. The directional analyser can be configured in some embodiments to perform a cross correlation between the microphone/decoder sub-band frequency domain signals within a suitable processing means.

In the direction analyser the delay value of the cross correlation is found which maximises the cross correlation of the frequency domain sub-band signals. This delay can in some embodiments be used to estimate the angle or represent the angle from the dominant audio signal source for the sub-band. This angle can be defined as a. It would be understood that whilst a pair or two microphones can provide a first angle, an improved directional estimate can be produced by using more than two microphones and preferably in some embodiments more than two microphones on two or more axes.

The directional analyser can then be configured to determine whether or not all of the sub-bands have been selected. Where all of the sub-bands have been selected in some embodiments then the direction analyser can be configured to output the directional analysis results. Where not all of the sub-bands have been selected then the operation can be passed back to selecting a further sub-band processing step.

The above describes a direction analyser performing an analysis using frequency domain correlation values. However it would be understood that the direction analyser can perform directional analysis using any suitable method. For example in some embodiments the object detector and separator can be configured to output specific azimuth-elevation values rather than maximum correlation delay values. Furthermore in some embodiments the spatial analysis can be performed in the time domain.

In some embodiments this direction analysis can therefore be defined as receiving the audio sub-band data;

$$X_k^b(n)=x_k(n_b+n), n=0, \ldots, n_{b+1}-n_b-1, b=0, \ldots, B-1$$

where $n_b$ is the first index of bth subband. In some embodiments for every subband the directional analysis as described herein as follows. First the direction is estimated with two channels. The direction analyser finds delay $\tau_b$ that maximizes the correlation between the two channels for subband b. DFT domain representation of e.g. $x_k^b(n)$ can be shifted $\tau_b$ time domain samples using $$X_{k,\tau_b}^b(n) = x_k^b(n)e^{-j\frac{2\pi n\tau_b}{N}} \quad X_{k,\tau_b}^b(n) = X_k^b(n)e^{-j\frac{2\pi n\tau_b}{N}}.$$

The optimal delay in some embodiments can be obtained from $$\max_{\tau_b} \mathrm{Re}\left(\sum_{n=0}^{n_{b+1}-n_b-1} \left(X_{k,\tau_b}^b(n) * X_3^b(n)\right)\right) \cdot \tau_b \in [-D_{tot}, D_{tot}]$$

where Re indicates the real part of the result and * denotes complex conjugate. $X_{2,\tau_b}{}^b$ and $X_3{}^b$ are considered vectors with length of $n_{b+1}-n_b n_{b+1}-n_b$ samples. The direction analyser can in some embodiments implement a resolution of one time domain sample for the search of the delay.

In some embodiments the direction analyser can be configured to generate a sum signal. The sum signal can be mathematically defined as.

$$X_{sum}^b \begin{cases} \left(X_{2,\tau_b}^b(n) + X_3^b\right)/2 & \tau_b \le 0 \\ \left(X_{2,\tau_b}^b(n) + X_{3,-\tau_b}^b\right)/2 & \tau_b > 0 \end{cases}$$

In other words the direction analyser is configured to generate a sum signal where the content of the channel in which an event occurs first is added with no modification, whereas the channel in which the event occurs later is shifted to obtain best match to the first channel.

It would be understood that the delay or shift $\tau_b$ indicates how much closer the sound source is to one microphone (or channel) than another microphone (or channel). The direction analyser can be configured to determine actual difference in distance as $$\Delta_{23} = \frac{v\tau_b}{F_s}$$

where Fs is the sampling rate of the signal and v is the speed of the signal in air (or in water if we are making underwater recordings).

The angle of the arriving sound is determined by the direction analyser as, $$\dot{\alpha}_2 = \pm\cos^{-1}\left(\frac{\Delta_{23}^2 + 2b\Delta_{23} - d^2}{2db}\right)$$

where d is the distance between the pair of microphones/channel separation and b is the estimated distance between sound sources and nearest microphone. In some embodiments the direction analyser can be configured to set the value of b to a fixed value. For example b=2 meters has been found to provide stable results.

It would be understood that the determination described herein provides two alternatives for the direction of the arriving sound as the exact direction cannot be determined with only two microphones/channels.

In some embodiments the direction analyser can be configured to use audio signals from a third channel or the third microphone to define which of the signs in the determination is correct. The distances between the third channel or microphone and the two estimated sound sources are:

$$\delta_b^{+}=\sqrt{(h+b\sin(\dot{\alpha}_b))^2+(d/2+b\cos(\dot{\alpha}_b))^2}$$

$$\delta_b^{-}=\sqrt{(h-b\sin(\dot{\alpha}_b))^2+(d/2+b\cos(\dot{\alpha}_b))^2}$$

where h is the height of an equilateral triangle (where the channels or microphones determine a triangle), i.e.

$$h=\frac{\sqrt{3}}{2}d$$

The distances in the above determination can be considered to be equal to delays (in samples) of;

$$\tau_b^{+}=\frac{\delta_b^{+}-b}{v}F_s$$

$$\tau_b^{-}=\frac{\delta_b^{-}-b}{v}F_s$$

Out of these two delays the direction analyser in some embodiments is configured to select the one which provides better correlation with the sum signal. The correlations can for example be represented as $$c_b^{+}=\mathrm{Re}\left(\sum_{n=0}^{n_{b+1}-n_b-1}\left(X_{sum,\tau_b^{+}}^{b}(n)*X_1^{b}(n)\right)\right)$$

$$c_b^{-}=\mathrm{Re}\left(\sum_{n=0}^{n_{b+1}-n_b-1}\left(X_{sum,\tau_b^{-}}^{b}(n)*x_1^{b}(n)\right)\right)$$

The direction analyser can then in some embodiments then determine the direction of the dominant sound source for subband b as:

$$\alpha_b\begin{cases}\dot{\alpha}_b & c_b^{+}\geq c_b^{-}\\ -\dot{\alpha}_b & c_b^{+}<c_b^{-}\end{cases}$$

In some embodiments the instance analyser 301 comprises a mid/side signal generator. The main content in the mid signal is the dominant sound source found from the directional analysis. Similarly the side signal contains the other parts or ambient audio from the generated audio signals. In some embodiments the mid/side signal generator can determine the mid M and side S signals for the sub-band according to the following equations:

$$M^b\begin{cases}(X_{2,\tau_b}^{b}+X_3^{b})/2 & \tau_b\leq 0\\ (X_2^{b}+X_{3,-\tau_b}^{b})/2 & \tau_b>0\end{cases}$$

$$S^b\begin{cases}(X_{2,\tau_b}^{b}+X_3^{b})/2 & \tau_b\leq 0\\ (X_2^{b}-X_{3,-\tau_b}^{b})/2 & \tau_b>0\end{cases}$$

It is noted that the mid signal M is the same signal that was already determined previously and in some embodiments the mid signal can be obtained as part of the direction analysis. The mid and side signals can be constructed in a perceptually safe manner such that the signal in which an event occurs first is not shifted in the delay alignment. The mid and side signals can be determined in such a manner in some embodiments is suitable where the microphones are relatively close to each other. Where the distance between the microphones is significant in relation to the distance to the sound source then the mid/side signal generator can be configured to perform a modified mid and side signal determination where the channel is always modified to provide a best match with the main channel.

The mid (M), side (S) and direction ($\alpha$) components of the captured audio signals can be output to an instance source/object processor 303.

The analysis of the audio signal to determine audio or sound source or objects is shown in FIG. 5 by step 403.

The instance processor 103 in some embodiments comprises an instance source/object processor 303. The instance source/object processor 303 is configured to receive the determined sources or object values and process these according to any desired requirement, the processing operation based on or dependent on the instance. In some embodiments the instance can be generated based on a user input.

The instance source/object processor 303 can thus be configured to emphasise or deemphasise the source or direction. In some embodiments the emphasis can be based on a zooming or focusing and in some embodiments be based on an attenuating or removing of unwanted sounds or objects or in some embodiments a focusing/defocusing by applying a reverberation filter. The instance source/object processor 303 can be configured to output the processed sources to a channel mapper 305.

For example using the above parameterization of the determined sources/objects one instance can be to pass the mid signal associated with a source which is within a defined region and to remove the mid signal (M) associated with a source which is outside of the region. In other words $$M'=M*g$$

where g is defined as $g=1$ if $\theta_1<\alpha<\theta_2$ and $g=0$ otherwise where $\theta_1<\alpha<\theta_2$ defines the pass band region (the defined region).

The operation of processing the source/objects is shown in FIG. 5 by step 405.

In some embodiments the instance processor 103 can comprise a channel mapper 305. The channel mapper 305 is configured to receive the processed source/object and generate a output multichannel, stereo or mono output.

In some embodiments the channel mapper 305 can for example be configured to apply a suitable mapping such as a head related transfer function (HRTF) to the identified sound sources locating them within a suitable stereo headset region.

In some embodiments the channel mapper 305 can output a single output (mono), two outputs (stereo), or any configuration multichannel output (surround sound).

The operation of mapping the processed object/sources for the instance is shown in FIG. 5 by step 407.

Furthermore the channel mapper 305 can be configured to output the mapped audio signal to an encoder instance or to an instance mixer.

The output of the mapped audio signal is shown in FIG. 5 by step 409.

Figure 6:
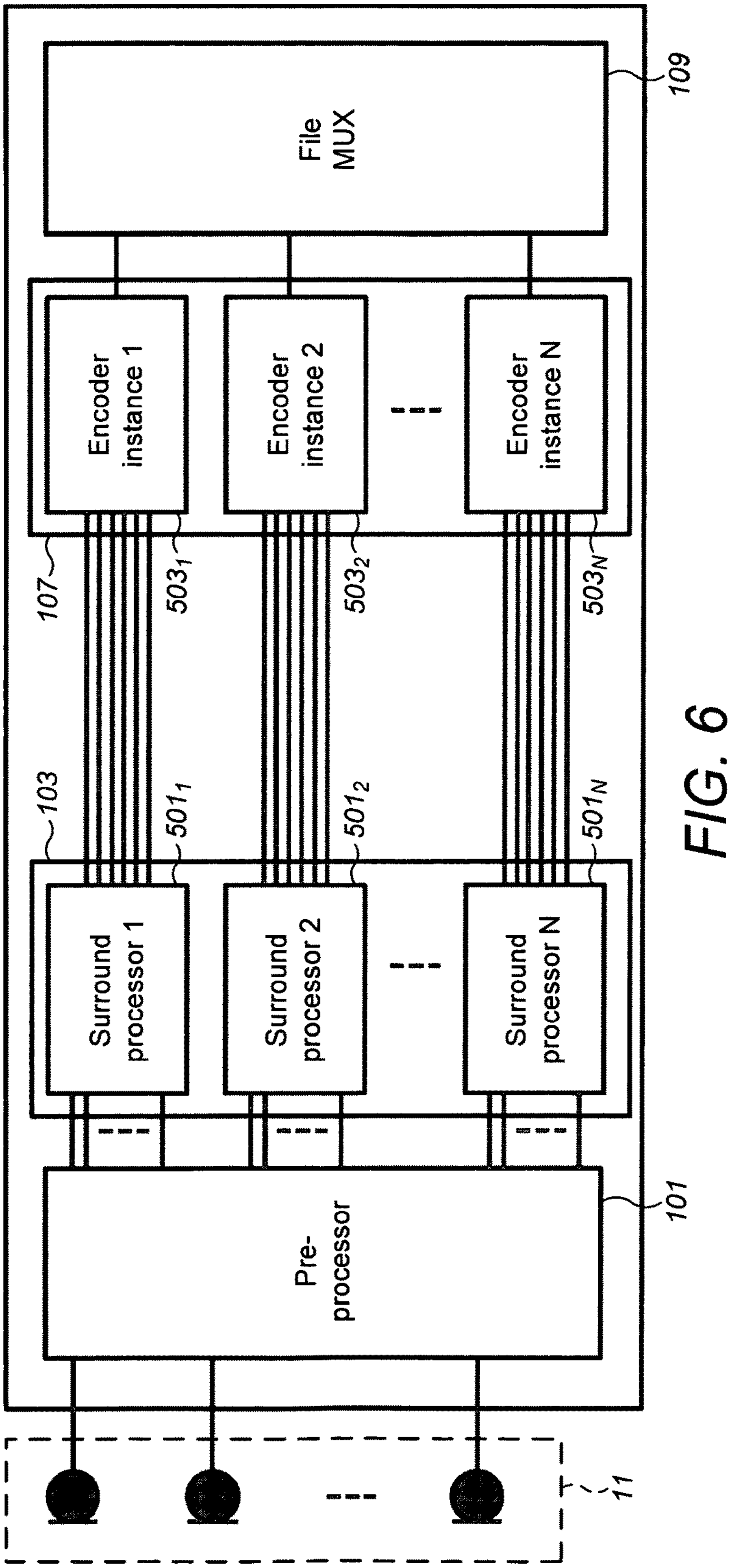
FIG. 6 shows schematically a first configuration of the example spatial audio signal processing apparatus according to some embodiments.

With respect to FIG. 6 a first configuration of the example spatial audio signal processing apparatus according to some embodiments is shown. The apparatus receives the audio signals from the microphones, which are shown as more than two microphones.

Furthermore the apparatus comprises the pre-processor 101 which carries out the pre-processing as described herein. For example providing generic microphone related processing such as microphone equalisation. It would be understood that in some embodiments although only one pre-processing block is shown for each instance or track that in some embodiments the pre-processor 101 is itself divided into instances of pre-processor or pre-processing instances which perform pre-processing for each of the instances or tracks.

In the example shown in FIG. 6 the instance processor 103 comprises N surround sound instances, a first surround sound processor instance surround processor 1 $\mathbf{501}_1$, a second surround sound processor instance surround processor 2 $\mathbf{501}_2$ and a N'th surround sound processor instance surround processor N $\mathbf{501}_N$.

Each surround sound processing block performs surround sound processing so that it can up mix or down mix if needed. For example from a three microphone input to a 5.1 or 7.1 or stereo output. Furthermore each of the surround sound processor instances can perform a defined instance processing simulating a possible beamforming pattern or other processing as described herein.

Each of the surround sound processor instances $\mathbf{501}_1$ to $\mathbf{501}_N$ outputs the multichannel output to the encoder and in particular an encoder instance matching the surround sound processor instance. Thus the first surround sound processor instance $\mathbf{501}_1$ outputs to a first encoder instance $\mathbf{503}_1$ and the N'th surround sound processor instance outputs to the N'th encoder instance $\mathbf{503}_N$.

In other words for each surround sound processor there is a separate multichannel encoder.

The encoder instances $\mathbf{503}_1$ to $\mathbf{503}_N$ then output the encoded signal to the file multiplexer 109 to be multiplexed together. In some embodiments the file multiplexer 109 can be configured to further output the different tracks to separate files which are logically linked together, for example by means of file naming.

Figure 7:
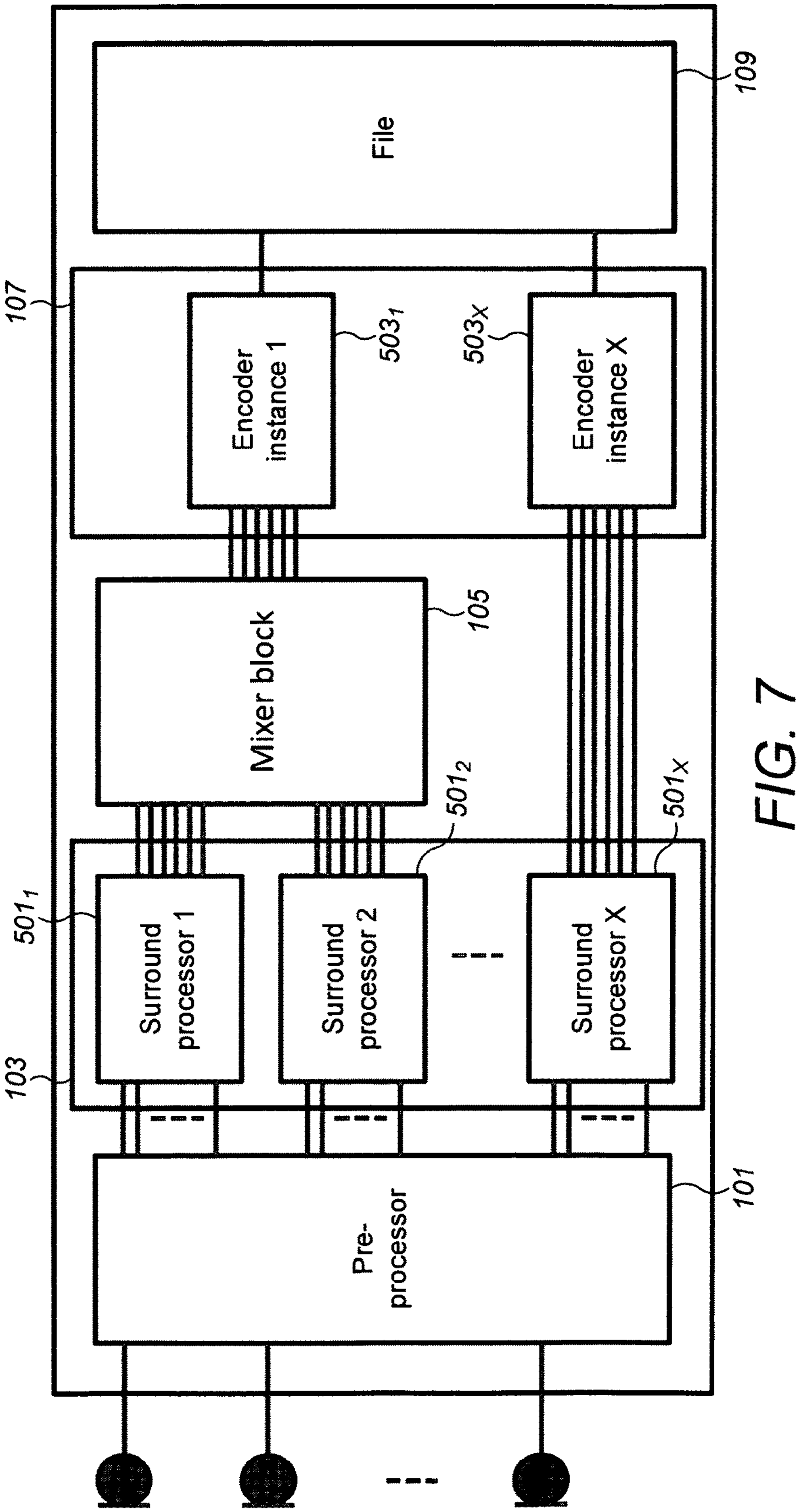
FIG. 7 shows schematically a second configuration of the example spatial audio signal processing apparatus according to some embodiments.

With respect to FIG. 7 a second configuration of the example spatial audio signal processing apparatus according to some embodiments is shown. The apparatus receives the audio signals from the microphones, which, similar to the configuration shown in FIG. 6, comprises more than two microphones.

Furthermore, similar to the example shown in FIG. 6, the apparatus comprises the pre-processor 101 which carries out the pre-processing as described herein.

In the example shown in FIG. 7 the instance processor 103 comprises X surround sound instances, a first surround sound processor instance surround processor 1 $\mathbf{501}_1$, a second surround sound processor instance surround processor 2 $\mathbf{501}_2$ and a X'th surround sound processor instance surround processor X $\mathbf{501}_X$.

Each surround sound processing block performs surround sound processing so that it can up mix or down mix if needed and can perform a defined instance processing for example simulating a possible beamforming pattern.

In the configuration shown in FIG. 7, the apparatus comprises a mixer 105 configured to receive the output of the first and second instances or tracks. The mixer 105 is configured to mix the outputs of the first and second instances or tracks to produce a combined instance output. For example in some embodiments the first instance or track defines a first beamforming pattern and the second instance or track defines a second beamforming pattern then the combined instance or track defines the combination of the two beamforming patterns. It would be understood that in some embodiments the mixer can be configured to generate a combination other than an additive or simple additive combination, such as a difference between the tracks or instances or a weighted additive combination. Furthermore although two tracks are shown being mixed or combined it would be understood that the number of tracks or instances being mixed or combined can be more than two.

The combined or mixed instance or track can as shown in FIG. 7 can then output to the encoder 107, where the instance or track is encoded by an encoding instance, for example encoder instance $\mathbf{503}_1$. Furthermore the encoder 107 comprises a X'th encoder instance $\mathbf{503}_X$ configured to receive the X'th surround sound processor instance $\mathbf{501}_X$. In other words for each surround sound processor output or combined output there is a separate multichannel encoder.

The encoder instances $\mathbf{503}_1$ and $\mathbf{503}_X$ then output the encoded signals to the file multiplexer 109 to be multiplexed together. In some embodiments the file multiplexer 109 can be configured to further multiplex the audio tracks or instances to a video track or instance.

Figure 8:
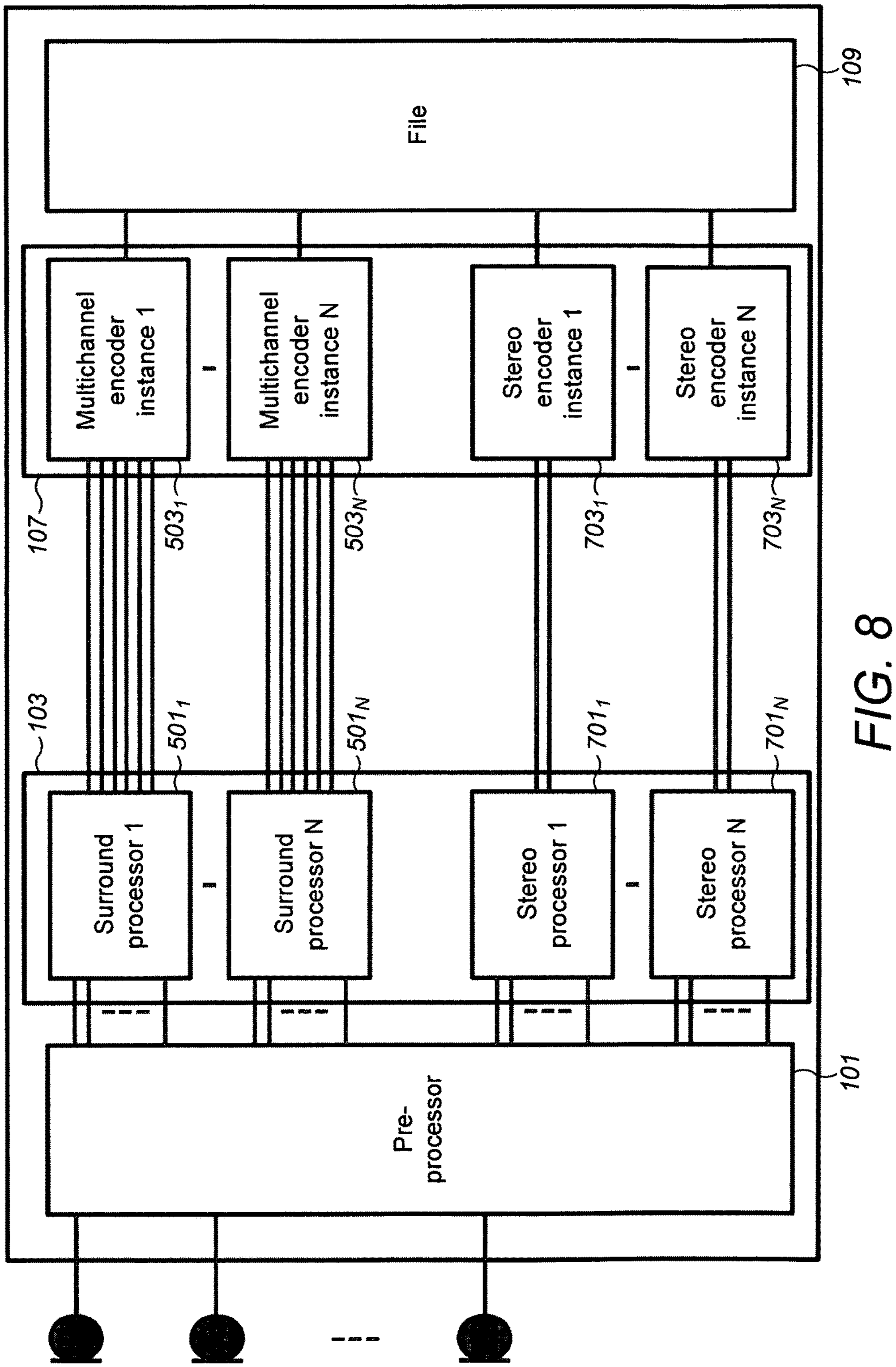
FIG. 8 shows schematically a third configuration of the example spatial audio signal processing apparatus according to some embodiments.

With respect to FIG. 8 a third configuration of the example spatial audio signal processing apparatus according to some embodiments is shown. The apparatus receives the audio signals from the microphones, which, similar to the configuration shown in FIG. 6, comprises more than two microphones.

Furthermore, similar to the example shown in FIG. 6, the apparatus comprises the pre-processor 101 which carries out the pre-processing as described herein.

In the example shown in FIG. 8 the instance processor 103 comprises N surround sound instances, a first surround sound processor instance surround processor 1 $\mathbf{501}_1$, a second surround sound processor instance surround processor 2 $\mathbf{501}_2$ and a N'th surround sound processor instance surround processor N $\mathbf{501}_N$.

Each surround sound processing block performs surround sound processing so that it can up mix or down mix if needed and can perform a defined instance processing for example simulating a possible beamforming pattern.

Furthermore the instance processor 103 comprises N stereo instances, a first stereo processor instance stereo processor 1 $\mathbf{701}_1$, a second stereo processor instance stereo processor 2 $\mathbf{701}_2$ and a N'th stereo processor instance stereo processor N $\mathbf{701}_N$.

The stereo processor instances in some embodiments differ from the surround processor instances in that no spatial processing is performed. However in such embodiments the processing performed on the audio signals can be processing such as sample rate conversion and range compression.

Each of the surround sound processor instances $\mathbf{501}_1$ to $\mathbf{501}_N$ outputs the multichannel output to the encoder and in particular an encoder instance matching the surround sound processor instance. Thus the first surround sound processor instance $\mathbf{501}_1$ outputs to a first multichannel encoder instance $\mathbf{503}_1$ and the N'th surround sound processor instance outputs to the N'th multichannel encoder instance $\mathbf{503}_N$. Similarly each of the stereo processor instances $\mathbf{701}_1$ to $\mathbf{701}_N$ outputs the stereo output to the encoder and in particular an encoder instance matching the stereo processor instance. Thus the first stereo processor instance $\mathbf{701}_1$ outputs to a first stereo encoder instance $703_1$ and the N'th stereo processor instance $701_N$ outputs to the N'th stereo encoder instance $703_N$.

The encoder instances $503_1$ to $503_N$ and $703_1$ to $703_N$ can then be output the encoded signal to the file multiplexer 109 to be multiplexed together. In some embodiments the file multiplexer 109 can be configured to further multiplex the audio tracks or instances to a video track or instance.

Figure 9:
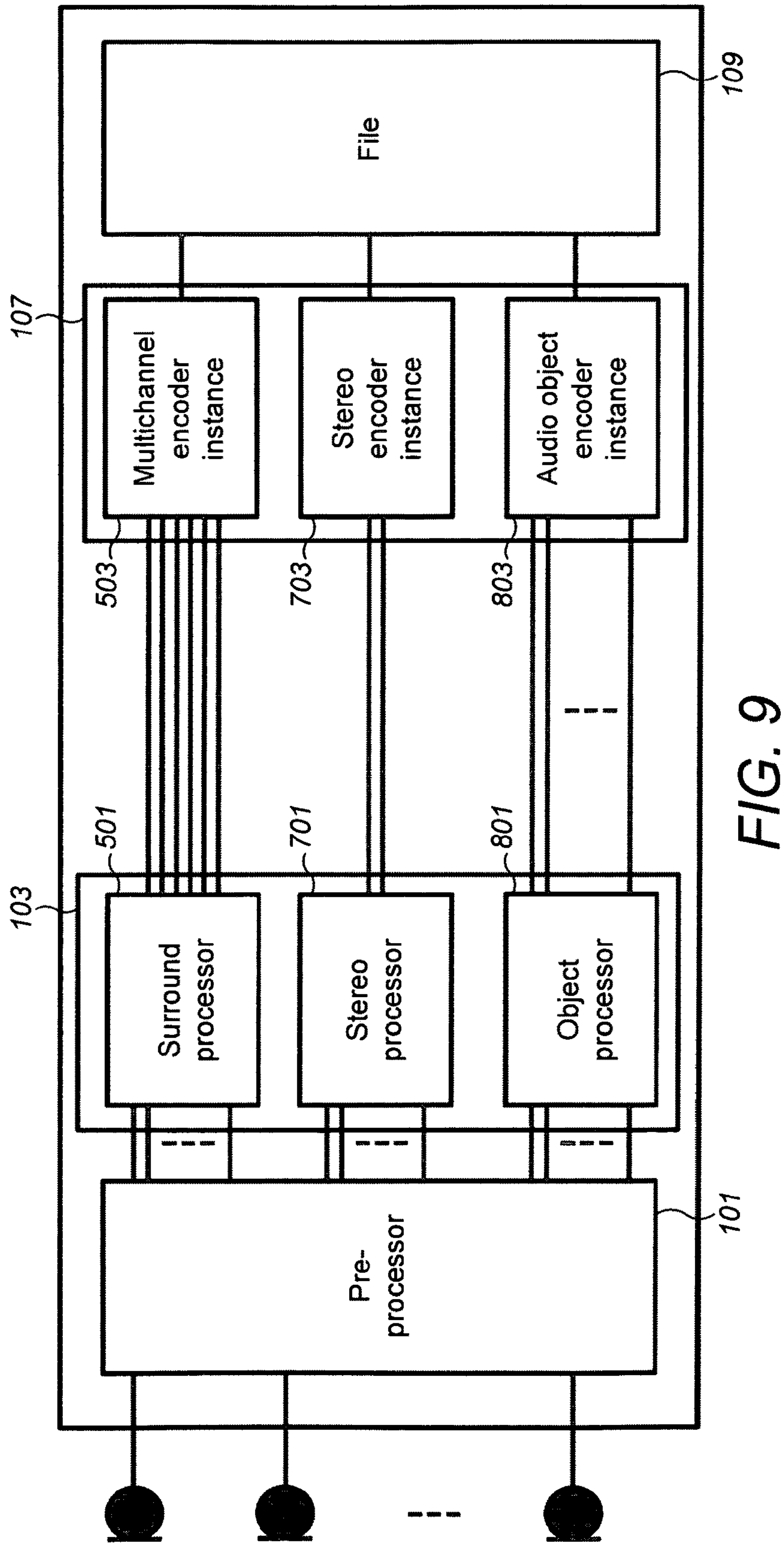
FIG. 9 shows schematically a fourth configuration of the example spatial audio signal processing apparatus according to some embodiments.

With respect to FIG. 9 a fourth configuration of the example spatial audio signal processing apparatus according to some embodiments is shown. The apparatus receives the audio signals from the microphones, which, similar to the configuration shown in FIG. 6, comprises more than two microphones.

Furthermore, similar to the example shown in FIG. 6, the apparatus comprises the pre-processor 101 which carries out the pre-processing as described herein.

In the example shown in FIG. 9 the instance processor 103 comprises a surround sound instance, surround processor 501.

The surround sound processing block as described herein is configured to perform surround sound processing so that it can up mix or down mix if needed and can perform a defined instance processing for example simulating a possible beamforming pattern.

Furthermore the instance processor 103 comprises a stereo instance, stereo processor 701. The stereo processor instances configured to perform processing such as sample rate conversion and range compression.

The instance processor 103 furthermore comprises an object instance, object processor 801. The object processor 801 is configured to find or determine the audio objects or sources and output the object or source information. For example in some embodiments the object processor 801 is configured to determine an audio source or object and output this information or a processed version of this information. For example using the example object determiner shown in FIG. 3, the object processor is configured to output only the audio signal from a single object, in other words the mapper is configured to operate on a single mid signal and angle of arrival in generating the output rather than all of the mid signals and the side signal.

Each of the outputs from the surround sound instance—surround processor 501, stereo instance—stereo processor 701, and object instance—object processor 801 are output to the encoder and in particular an encoder instance matching the instance. Thus in the example shown in FIG. 9, the surround processor 501 outputs to a multichannel encoder instance 503, the stereo processor 701 outputs to stereo encoder instance 703 and the object processor 801 outputs to an audio object encoder instance 803.

The encoder instances 503, 703 and 803 then output the encoded signal to the file multiplexer 109 to be multiplexed together. In some embodiments the file multiplexer 109 can be configured to further multiplex the audio tracks or instances to a video track or instance.

Figure 10:
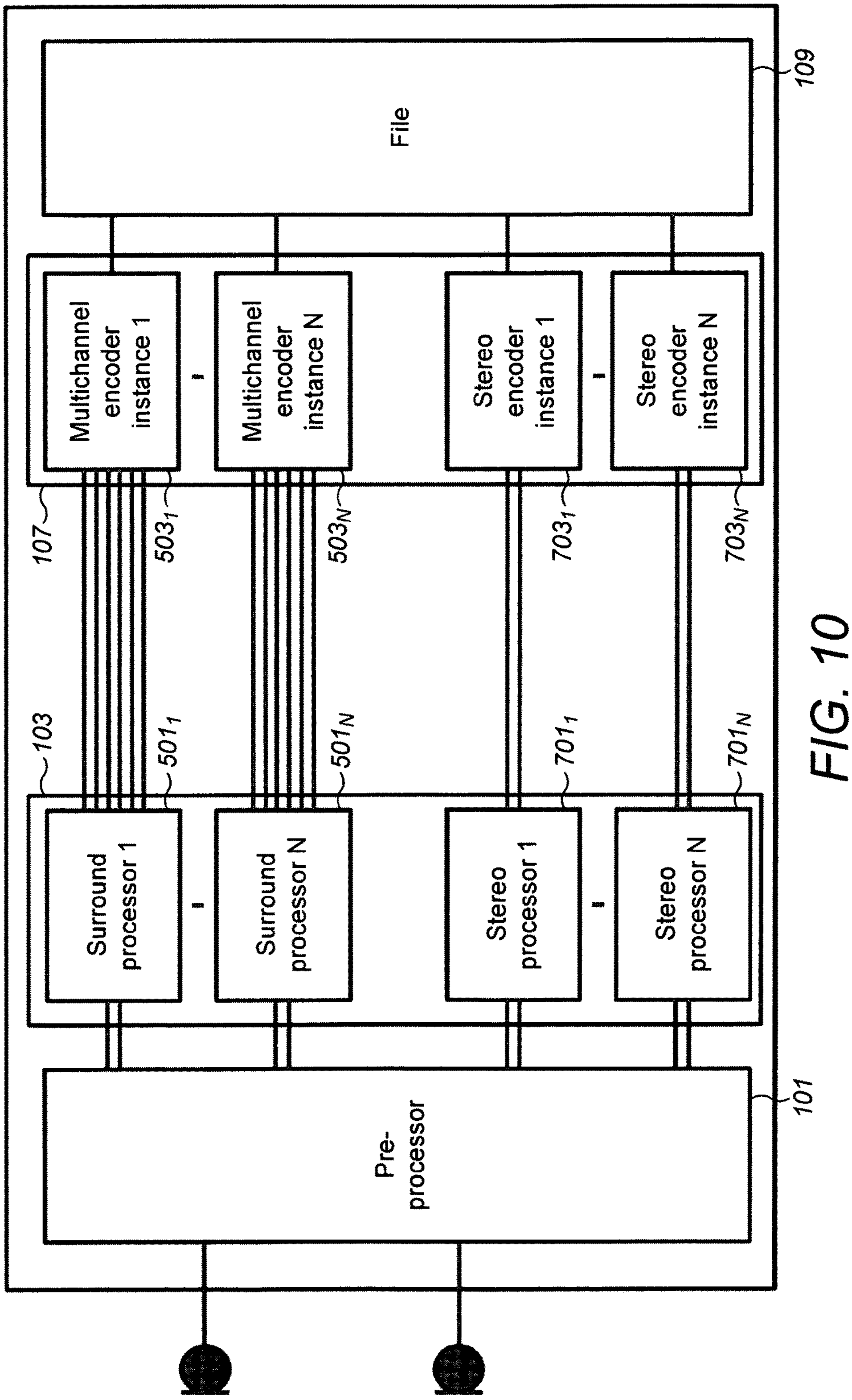
FIG. 10 shows schematically a fifth configuration of the example spatial audio signal processing apparatus according to some embodiments.

With respect to FIG. 10 a fifth configuration of the example spatial audio signal processing apparatus according to some embodiments is shown. The apparatus receives the audio signals from the microphones, which comprises two microphones.

The apparatus further comprises the pre-processor 101 which carries out the pre-processing as described herein.

In the example shown in FIG. 10 the instance processor 103 comprises N surround sound instances, a first surround sound processor instance surround processor 1 $501_1$, a second surround sound processor instance surround processor 2 $501_2$ and a N'th surround sound processor instance surround processor N $501_N$.

Each surround sound processing block performs surround sound processing so that the processing block can up mix or down mix if needed however the lack of information from the limited number of microphones permits virtual surround processing but does not enable the source location, spatial processing, and beamforming pattern simulation operations as no audio sources or objects can be determined sufficiently accurately. Furthermore similar to the stereo processor instances processing such as sample rate conversion, range compression or other processing, such as stereo widening, can be performed in the surround processors.

Furthermore the instance processor 103 comprises N stereo instances, a first stereo processor instance stereo processor 1 $701_1$, a second stereo processor instance stereo processor 2 $701_2$ and a N'th stereo processor instance stereo processor N $701_N$.

The stereo processor instances furthermore do not perform spatial processing. However in such embodiments the processing performed on the audio signals can be processing such as sample rate conversion and range compression.

Each of the surround sound processor instances $501_1$ to $501_N$ outputs the multichannel output to the encoder and in particular an encoder instance matching the surround sound processor instance. Thus the first surround sound processor instance $501_1$ outputs to a first multichannel encoder instance $503_1$ and the N'th surround sound processor instance outputs to the N'th multichannel encoder instance $503_N$. Similarly each of the stereo processor instances $701_1$ to $701_N$ outputs the stereo output to the encoder and in particular an encoder instance matching the stereo processor instance. Thus the first stereo processor instance $701_1$ outputs to a first stereo encoder instance $703_1$ and the N'th stereo processor instance $701_N$ outputs to the N'th stereo encoder instance $703_N$.

The encoder instances $503_1$ to $503_N$ and $703_1$ to $703_N$ can then be output the encoded signal to the file multiplexer 109 to be multiplexed together. In some embodiments the file multiplexer 109 can be configured to further multiplex the audio tracks or instances to a video track or instance.

With respect to FIGS. 16 to 23 a series of example beamform patterns which can be generated by surround sound processor instances are shown. It would be understood that the Figures shown herein are examples of possible beamform patterns only and the width of the teardrop patterns (in other words the directionality of the beams) implemented in embodiments can differ from those shown.

Figure 16:
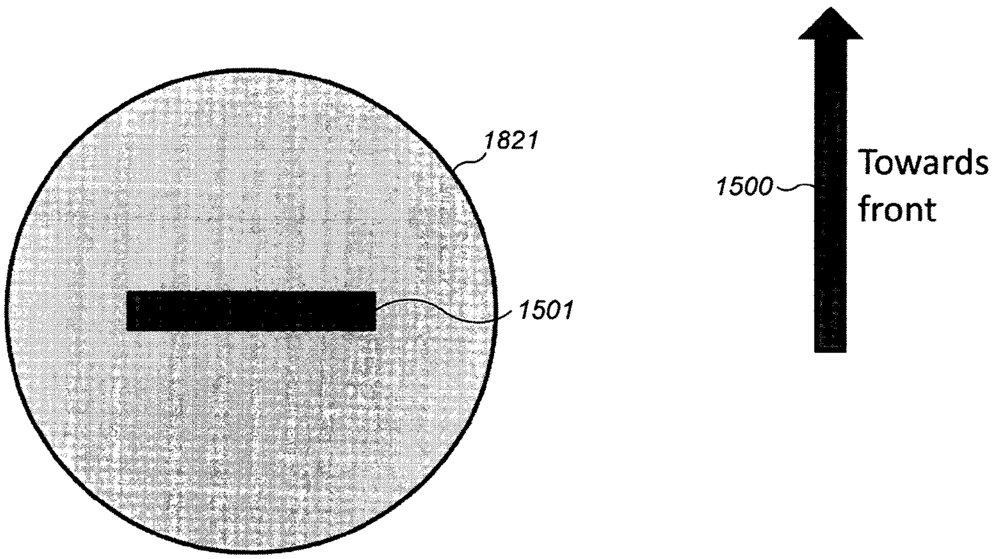
FIG. 16 shows schematically a first example spatial audio signal processing beamform pattern according to some embodiments.

With respect to FIG. 16 an example 'unbiased' or full pattern is shown. The apparatus 1501 is shown with a front direction 1500 and is configured to record or capture audio signals with a directional gain defined by the beamform pattern distance at an angle of arrival relative to the apparatus. In the unbiased pattern the recording is performed without any specific directional gain or directional focus. This is shown in FIG. 16 by the circular beam pattern 1821 surrounding the apparatus 1501.

Figure 17:
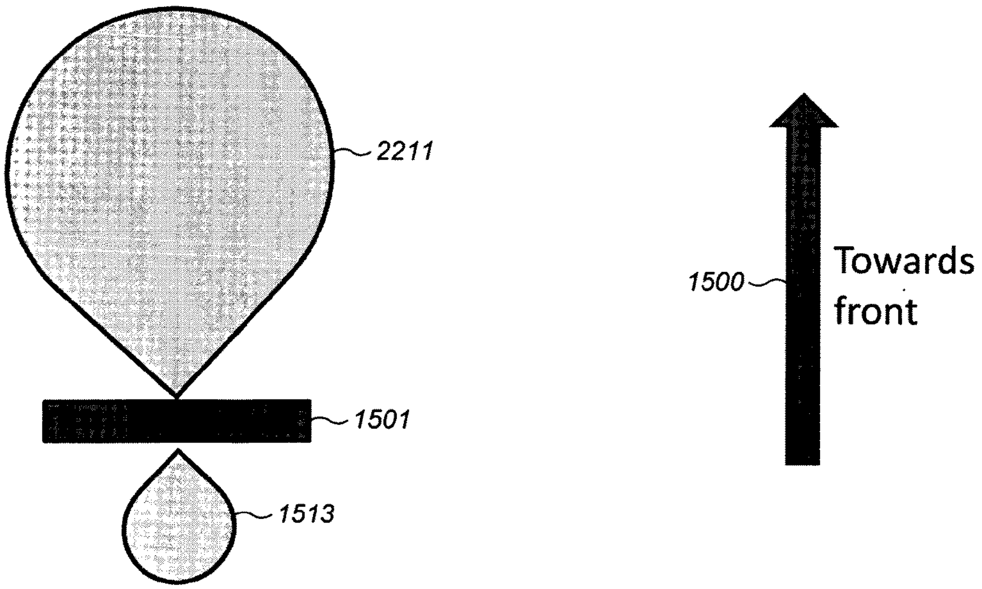
FIG. 17 shows schematically a second example spatial audio signal processing beamform pattern according to some embodiments.

With respect to FIG. 17 an example 'front zoom' beamform pattern is shown. The 'front zoom' beamform pattern can be one where the apparatus 1501 (with front direction arrow 1500) is shown with a first beamform pattern 2211 (a teardrop shape) directed centrally and to the front and thus indicating a gain or focus directly forward of the apparatus and a second beamform pattern 1513 (also a teardrop shape) directed directly behind and centrally. It would be understood that the second beamform pattern 1513 is an example of audio signal processing used to generate the first beamform pattern 2211. In other words the second beamform pattern 1513 can be considered to be a side-effect of the processing of the audio signal required to generated the first beamform 2211 pattern. The second beamform pattern 1513 is configured with a lower maximum gain than the first beamform pattern 2211. This type of beamform pattern configuration can for example be used to follow a video zoom and attempt to record or capture audio signals in front of the apparatus distant from the apparatus.

Figure 18:
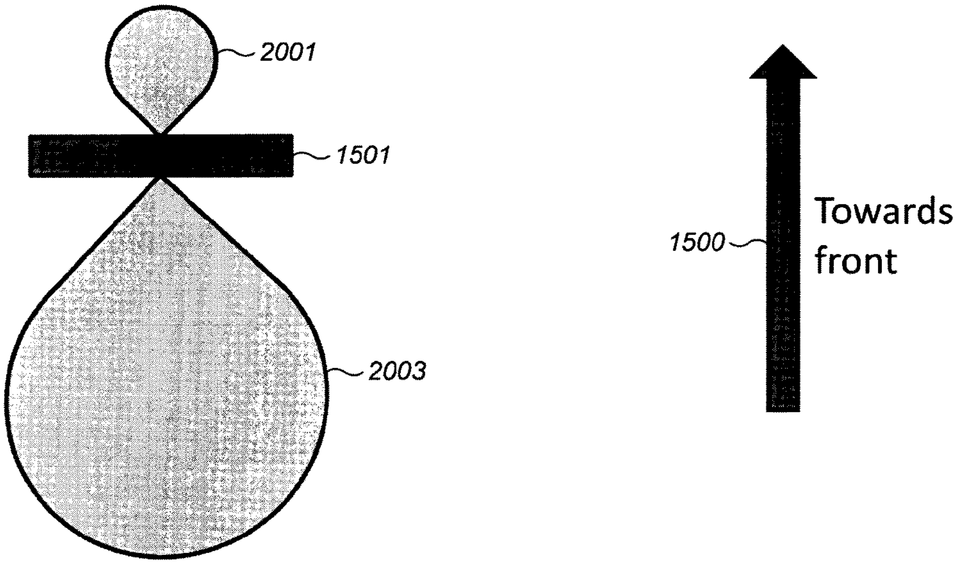
FIG. 18 shows schematically a third example spatial audio signal processing beamform pattern according to some embodiments.

With respect to FIG. 18 a third example, the 'narrator recording', beamform pattern is shown. The 'narrator recording' beamform pattern can be one where the apparatus 1501 (with front direction arrow 1500) is shown with a first beamform pattern 2001 (a teardrop shape) directed centrally and to the front and thus indicating a gain or focus directly forward of the apparatus and a second beamform pattern 2003 (also a teardrop shape) directed directly behind and centrally. The second beamform pattern 2003 is configured with a larger maximum gain than the first beamform pattern 2001. It would be understood that the first beamform pattern 2001 is an example of audio signal processing used to generate the second beamform pattern 2003. In other words the second beamform pattern 2001 is the desired beamform which also results in the side-effect of generating the first beamform pattern 2001. This type of beamform pattern configuration can for example be used to record audio sources directly in front of the apparatus but focuses on the user of the apparatus.

Figure 19:
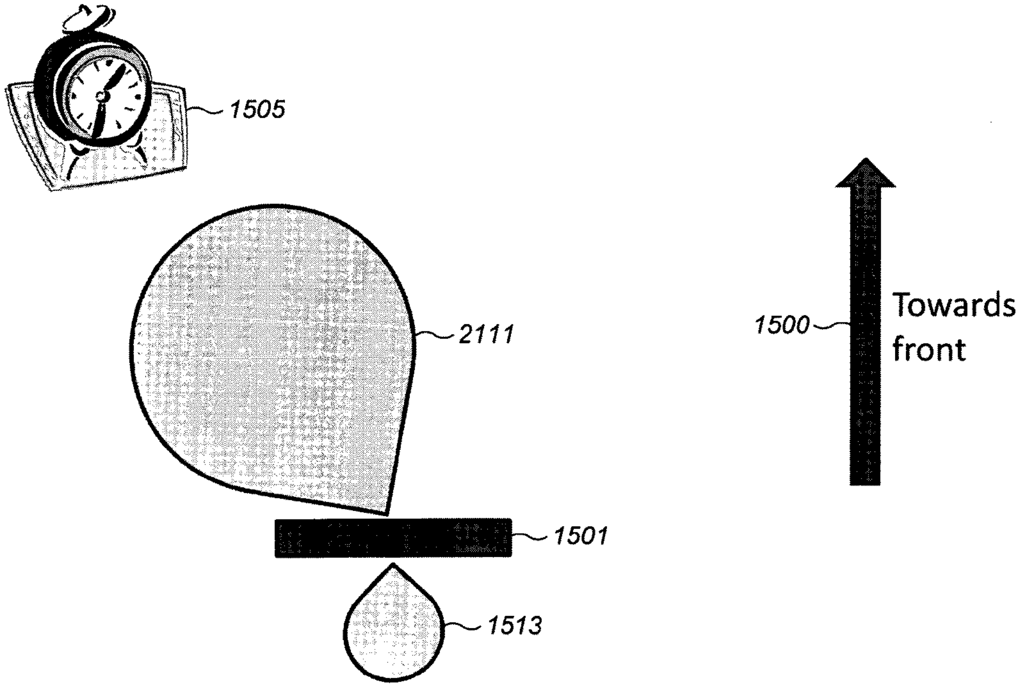
FIG. 19 shows schematically a fourth example spatial audio signal processing beamform pattern according to some embodiments.

With respect to FIG. 19 a fourth example, the 'dominant audio source recording', beamform pattern is shown. The 'dominant audio source recording' beamform pattern can be one where the apparatus 1501 (with front direction arrow 1500) is shown with a first beamform pattern 2111 (a teardrop shape) directed towards the audio source 1505 and to the front and thus indicating a maximum gain or focus directly towards the audio source and a second beamform pattern 1513 (a side effect teardrop shape similar to that shown in FIG. 17) directed directly behind and centrally (similar to the rear beamform pattern shown in FIG. 17). The second beamform pattern 1513 is configured with a lower maximum gain than the first beamform pattern 2111. This type of beamform pattern configuration can for example be used to record an audio source, for example the loudest audio source, which is off centre from the centre forward direction of the apparatus, in other words in some embodiments away from the centre of the image being recorded by the camera.

Figure 20:
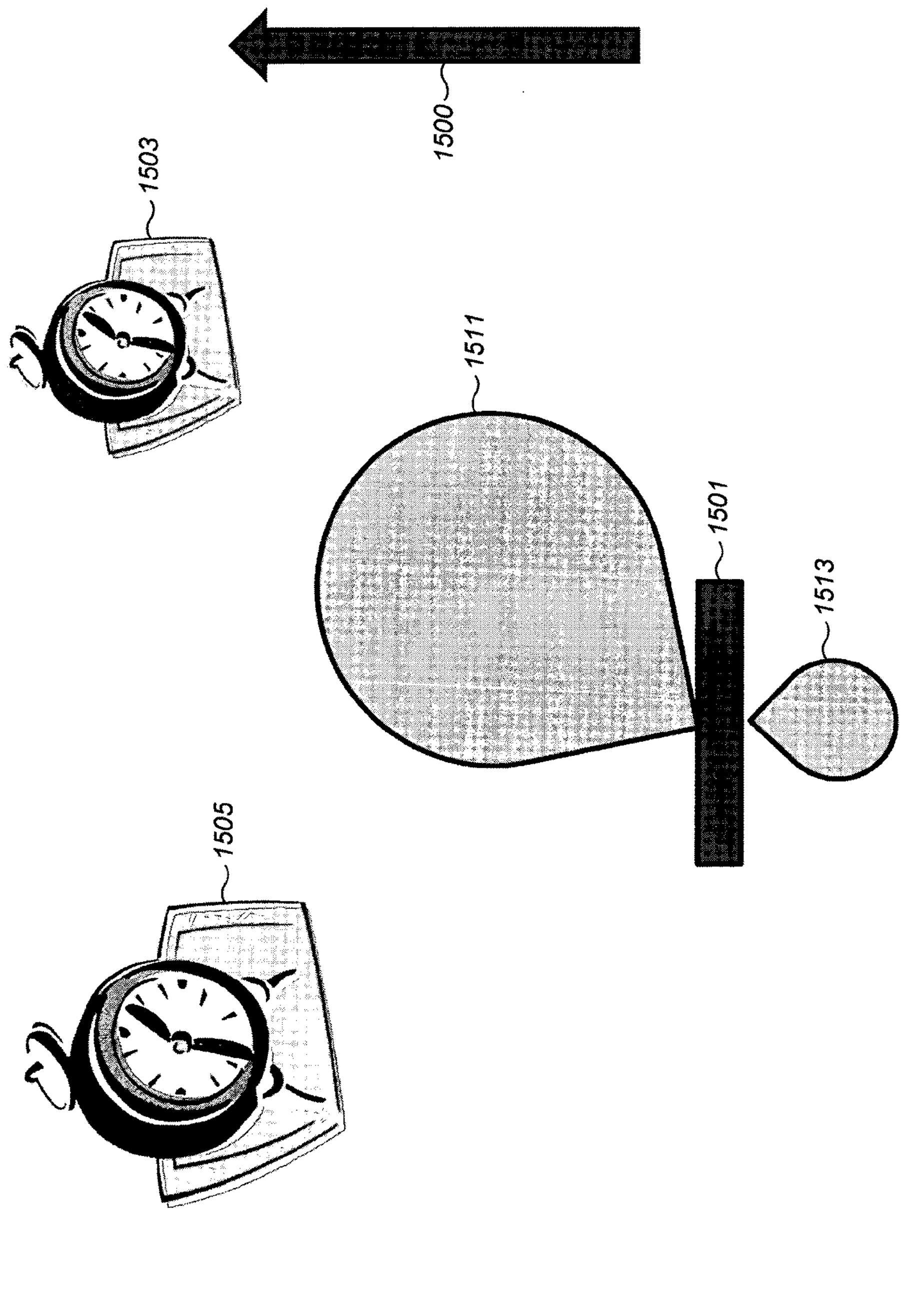
FIG. 20 shows schematically a fifth example spatial audio signal processing beamform pattern according to some embodiments.

With respect to FIG. 20 a fifth example, the 'secondary audio source recording', beamform pattern is shown. The 'secondary audio source recording' beamform pattern can for example be produced by an processing instance determining a dominant or primary audio source, a secondary or minor audio source and the directions of the audio sources and then generating a first beamform pattern 1511 (a teardrop shape) directed towards a minor or secondary audio source 1503, away from the dominant audio source 1505 and to the front and thus indicating a maximum gain or focus directly towards the secondary or minor audio source and a second beamform pattern 1513 (a side effect teardrop shape similar to that shown in FIGS. 17 and 19) directed directly behind and centrally. The second beamform pattern 1513 is configured with a lower maximum gain than the first beamform pattern 2111. This type of beamform pattern configuration can for example be used to record an audio source which is not the loudest audio source and which can be off centre from the centre-forward direction of the apparatus. This directed beamform pattern thus suppresses the loudest source with respect to the minor source.

Figure 21:
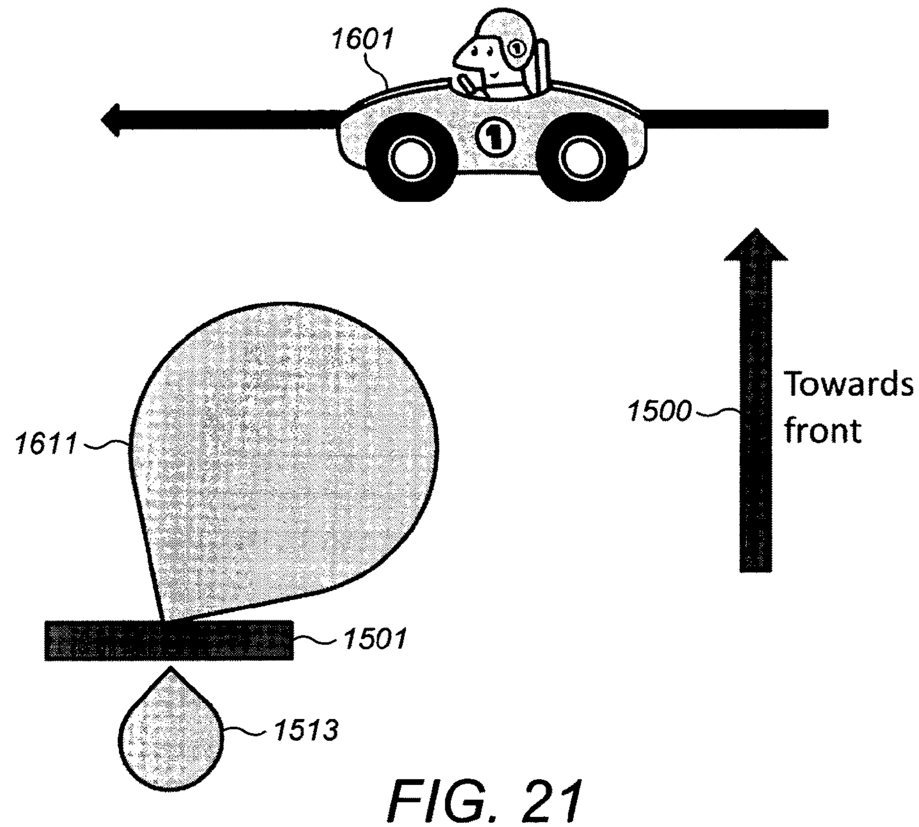
FIG. 21 shows schematically a sixth example spatial audio signal processing beamform pattern according to some embodiments.

With respect to FIG. 21, a sixth example, the 'tracking audio source recording', beamform pattern is shown. The 'tracking audio source recording' can for example be produced by an processing instance determining an audio source and the direction of the audio source and then generating a beamform pattern having a first beamform pattern 1611 (a teardrop shape) directed towards the audio source 1601 and to the front and thus indicating a maximum gain or focus directly towards the audio source, and furthermore following the direction of the audio source. Furthermore the 'tracking audio source recording' can in some embodiments comprise a second beamform pattern 1513 (also a teardrop shape) directed directly behind and centrally (a side effect teardrop shape similar to that shown in FIGS. 17, 19 and 20). The second beamform pattern 1513 is configured with a lower maximum gain than the first beamform pattern 1611. This type of beamform pattern configuration can for example be used to record an audio source which moves in front of the apparatus without the need for the apparatus to move to track the source.

Figure 22:
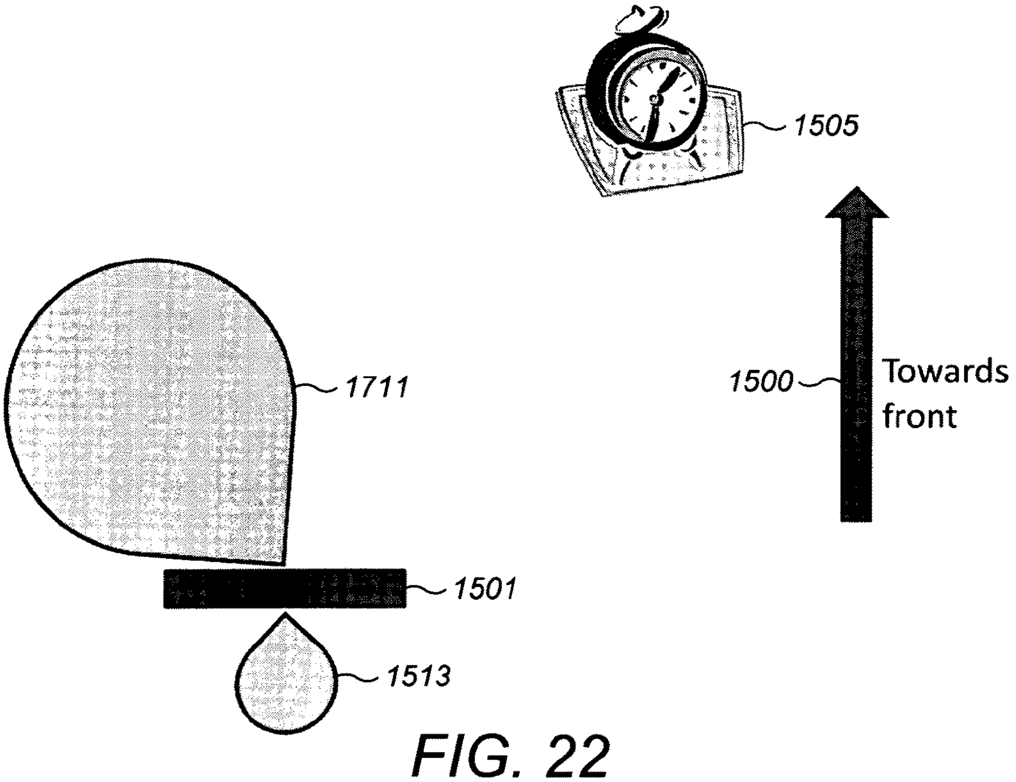
FIG. 22 shows schematically a seventh example spatial audio signal processing beamform pattern according to some embodiments.

With respect to FIG. 22 a fifth example, the 'avoid dominant audio source recording', beamform pattern is shown. The 'avoid dominant audio source recording' beamform pattern can for example be performed by an processing instance determining an audio source and the direction of the audio source and then generating a beamform pattern with a first beamform pattern 1711 (a teardrop shape) directed away from the audio source 1505 and to the front and thus indicating a maximum gain or focus away from the audio source and a second beamform pattern 1513 (also a teardrop shape) directed directly behind and centrally (a side effect teardrop shape similar to that shown in FIGS. 17, 19 to 21). The second beamform pattern 1513 is configured with a lower maximum gain than the first beamform pattern 1711. This type of beamform pattern configuration can for example be used to record an audio environment but attempt to suppress an dominant source, for example the loudest audio source.

Figure 23:
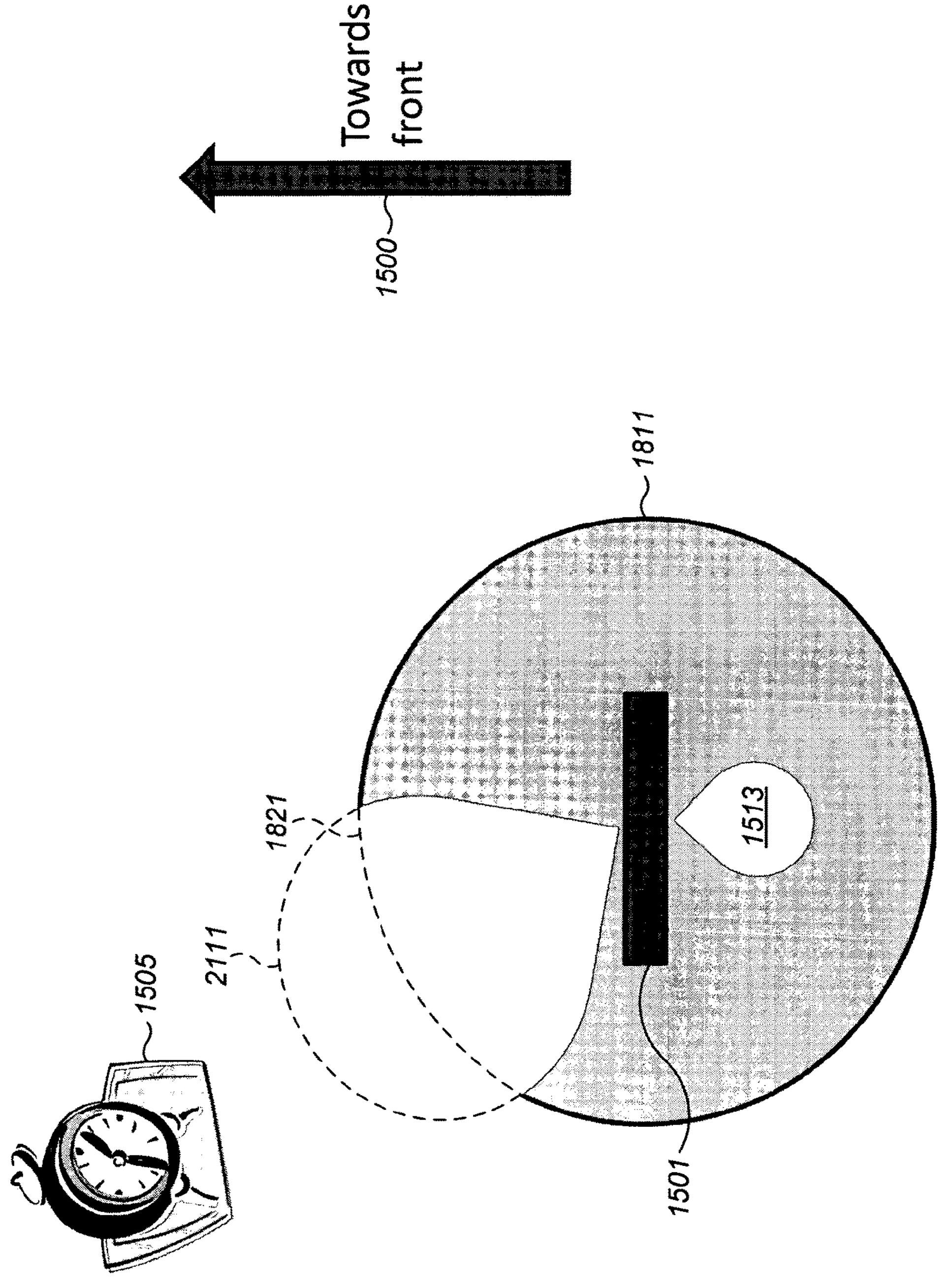
FIG. 23 shows schematically an eighth example spatial audio signal processing beamform pattern according to some embodiments.

With respect to FIG. 23 an example of a complex or combined beamform pattern is shown. The beamform pattern shown in FIG. 23 is a combination of the beamform pattern shown in FIG. 16, an 'unbiased' beamform and the beamform pattern shown in FIG. 19, a 'dominant audio source recording' pattern. The combination which can be produced by a first processing instance generating the 'unbiased' beamform pattern and a second processing instance generating the 'dominant audio source recording' pattern can be passed to the mixer which is configured to subtract the 'dominant audio source recording' output from the 'unbiased' output to generate the pattern output shown in FIG. 23, in other words an ambience recording or capture track.

With respect to FIGS. 11 to 15 a series of example user interface displays are shown which can be used to control the processing instances and mixing operations.

Figure 11:
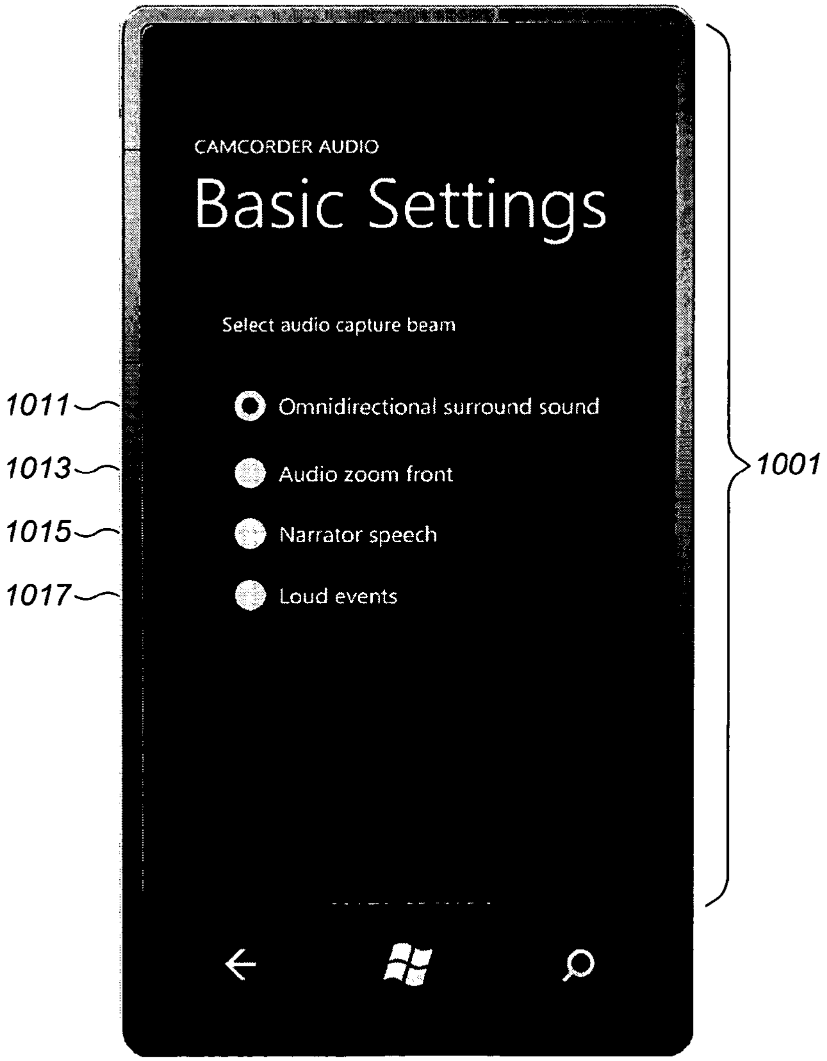
FIG. 11 shows schematically a first user interface display configuration for controlling the example spatial audio signal processing apparatus according to some embodiments.

With respect to FIG. 11 a first or 'basic' user interface is shown. The basic user interface 1001 is configured to enable a single output to be generated by selecting one simple or complex (combined) track or instance. For example as shown in FIG. 11 a radio button list or selection list is shown from which one of the selections is used to enable a processing instance to be generated.

The example list as shown in FIG. 11 comprises a first radio button 1011 labelled omnidirectional surround sound and configured if selected to generate an omnidirectional surround sound or unbiased pattern such as shown in FIG. 16. The example list further comprises a second radio button 1013 labelled audio zoom front and configured if selected to generate a beamform pattern similar to that shown in FIG. 17. The example list also comprises a third radio button 1015 labelled narrator speech configured if selected to generate a beamform pattern similar to that shown in FIG. 18, and a fourth radio button 1017 labelled loud events configured if selected to generate a dominant audio source recording beamform pattern such as shown in FIG. 19.

In this user interface example there are four options however there can be any number of options within the selection list.

Figure 12:
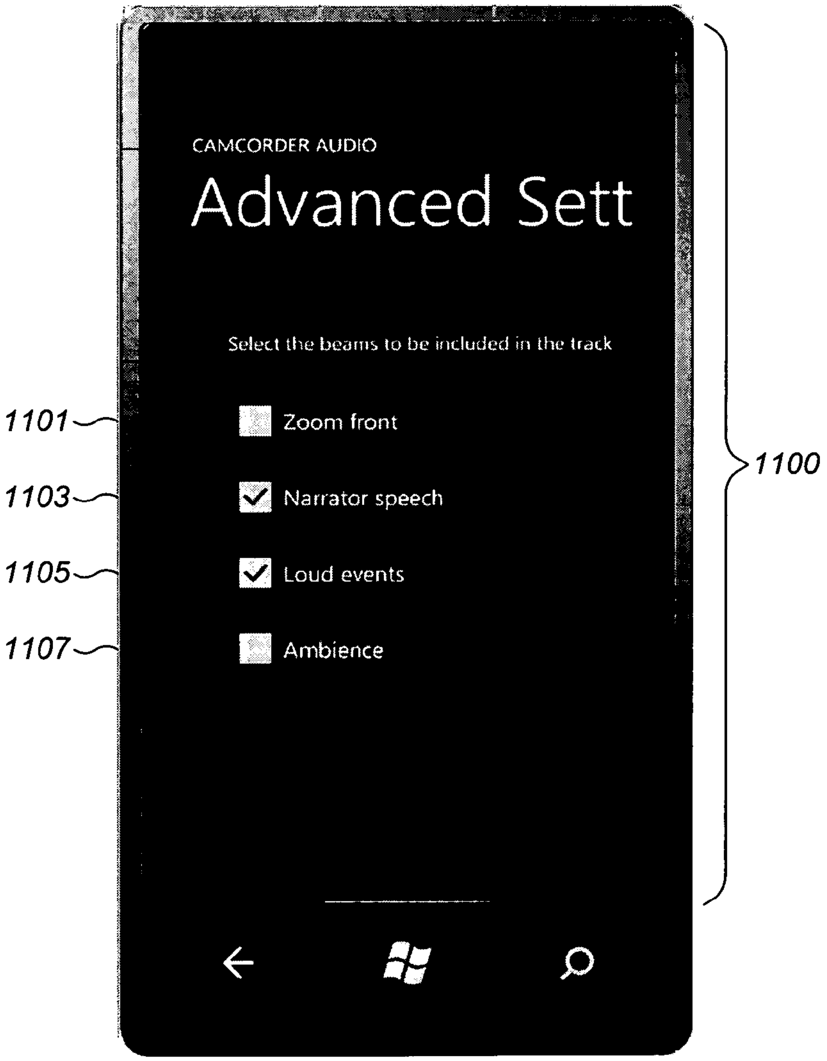
FIG. 12 shows schematically a second user interface display configuration for controlling the example spatial audio signal processing apparatus according to some embodiments.

With respect to FIG. 12 a second or 'advanced' user interface 1100 is shown. The advanced user interface 1100 is configured to enable multiple tracks or instances to be generated and possibly multiplexed onto an output signal. For example as shown in FIG. 12 a selection list of tick boxes are provided from which none, one or more tracks or instances can be selected.

The example list as shown in FIG. 12 comprises a first tick box 1101 labelled zoom front and configured if selected to generate a processing and encoding instance which implements a beamform pattern similar to that shown in FIG. 17. The list also comprises a second tick box 1103 labelled narrator speech configured if selected to generate a processing and encoding instance which implements a beamform pattern similar to that shown in FIG. 18, a third tick box 1105 labelled loud events configured if selected to generate a processing and encoding instance which implements a dominant audio source recording beamform pattern such as shown in FIG. 19, and a fourth tick box 1107 labelled ambience and configured if selected to generate a processing, mixing and encoding instance which implements a beamform pattern similar to that shown in FIG. 23.

In this user interface example there are four option tick boxes however there can be any number of options within the selection list.

Figure 13:
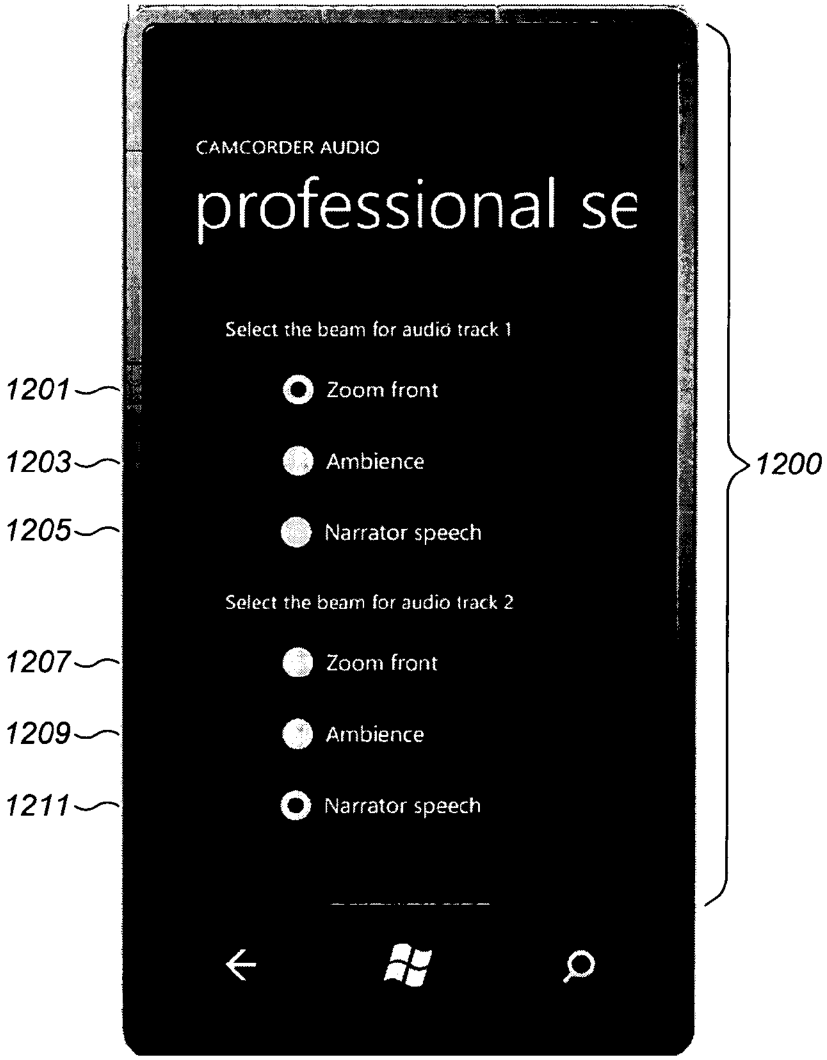
FIG. 13 shows schematically a third user interface display configuration for controlling the example spatial audio signal processing apparatus according to some embodiments.

With respect to FIG. 13 a third or 'professional' user interface 1200 is shown. The professional user interface 1200 is configured to enable multiple tracks or instances to be generated and possibly multiplexed onto an output signal. For example as shown in FIG. 13 a two selection list of radio buttons are provided from which each of the more tracks or instances can be selected.

The first audio track, audio track 1, selection list as shown in FIG. 13 comprises a first radio button 1201 labelled zoom front and configured if selected to generate a processing and encoding instance which implements a beamform pattern similar to that shown in FIG. 17, a second radio button 1203 labelled ambience and configured if selected to generate a processing, mixing and encoding instance which implements a beamform pattern similar to that shown in FIG. 23, and a third radio button 1205 labelled narrator speech configured if selected to generate a processing and encoding instance which implements a beamform pattern similar to that shown in FIG. 18.

The user can thus generate or control the generation of the first audio track or instance by selecting one of the three options.

The second audio track, audio track 2, selection list as shown in FIG. 13 comprises a fourth (for the user interface) radio button 1207 labelled zoom front and configured if selected to generate a processing and encoding instance which implements a beamform pattern similar to that shown in FIG. 17, a fifth radio button 1209 labelled ambience and configured if selected to generate a processing, mixing and encoding instance which implements a beamform pattern similar to that shown in FIG. 23, and a sixth radio button 1211 labelled narrator speech configured if selected to generate a processing and encoding instance which implements a beamform pattern similar to that shown in FIG. 18.

The user can thus generate or control the generation of the second audio track or instance by selecting one of the three options.

In other words the user interface can be configured for a defined number of tracks to display a selection of possible instances for each track. In the example shown herein each track is provided with the same list of options, however it would be understood that in some embodiments the options provided for difference tracks may differ. For example a first selection in a first track may prevent the same option to be made for a second or further track. This can for example be shown in the user interface by the greying out of the radio button selection option which has already been selected in another track.

Furthermore in the example shown herein there are two tracks however it would be understood that there may be more than two tracks from which the selections can be chosen.

Figure 14:
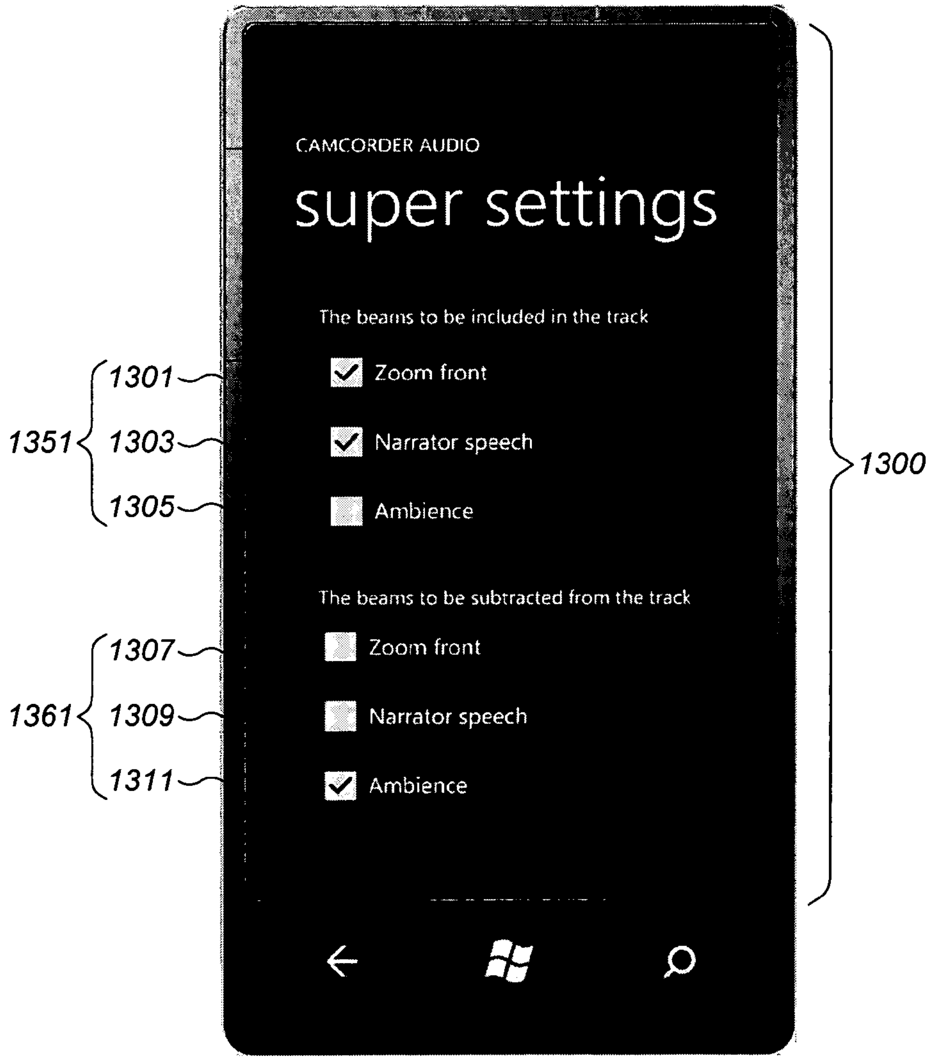
FIG. 14 shows schematically a fourth user interface display configuration for controlling the example spatial audio signal processing apparatus according to some embodiments.

With respect to FIG. 14 a fourth or 'super' user interface 1300 is shown. The super user interface 1300 is configured to enable complex tracks or instances to be generated and possibly multiplexed onto an output signal by selecting both additional (or additive) and subtracted (or difference) instances to be combined. For example as shown in FIG. 14 two selection lists of tick boxes are provided from each none, one or more tracks or instances can be selected.

The first 'additive' list 1351 as shown in FIG. 14 comprises a first tick box 1301 labelled zoom front and configured if selected to generate a processing and encoding instance which implements a beamform pattern similar to that shown in FIG. 17. The 'additive' list 1351 also comprises a second tick box 1303 labelled narrator speech configured if selected to generate a processing and encoding instance which implements a beamform pattern similar to that shown in FIG. 18 and a third tick box 1305 labelled ambience and configured if selected to generate a processing, mixing and encoding instance which implements a beamform pattern similar to that shown in FIG. 23.

The second 'difference' list 1361 as shown in FIG. 14 comprises a fourth (on the user interface) tick box 1307 labelled zoom front and configured if selected to generate a processing and encoding instance which implements a beamform pattern similar to that shown in FIG. 17. The 'difference' list 1361 also comprises a fifth tick box 1309 labelled narrator speech configured if selected to generate a processing and encoding instance which implements a beamform pattern similar to that shown in FIG. 18 and a sixth tick box 1311 labelled ambience and configured if selected to generate a processing, mixing and encoding instance which implements a beamform pattern similar to that shown in FIG. 23.

The settings can then be applied to the mixer such that the instances selected by the difference list selections are subtracted from the additive list selections. It would be understood that in some embodiments the mixer thus comprises a first mixing instance to generate a complex beamform pattern, for example when the ambience option is selected and a further mixing instance configured to combine the output of the first mixing instance with another instance (either another mixing instance or a processing instance) for example where one instance or track is subtracted from a further track. In some embodiments the complex beamform pattern instance is generated as part of the general mixing, for example where an ambience option is selected as an additive track or instance option the mixer receives the 'unbiased' beamform instance as an additive track or instance and the 'dominant audio source recording' beamform pattern as a difference track or instance to be combined with the other selected tracks (in other words only a single mixing stage is required to mix both simple and complex beamform patterns).

In some embodiments these lists can be copied to enable further tracks to be generated from combined tracks. In other words more there can be embodiments where there is more than one output track from the selected additive and difference track options. Furthermore it would be understood that the selection lists can be any list arrangement and configuration. For example the additive and difference lists can comprise different lists of options.

Figure 15:
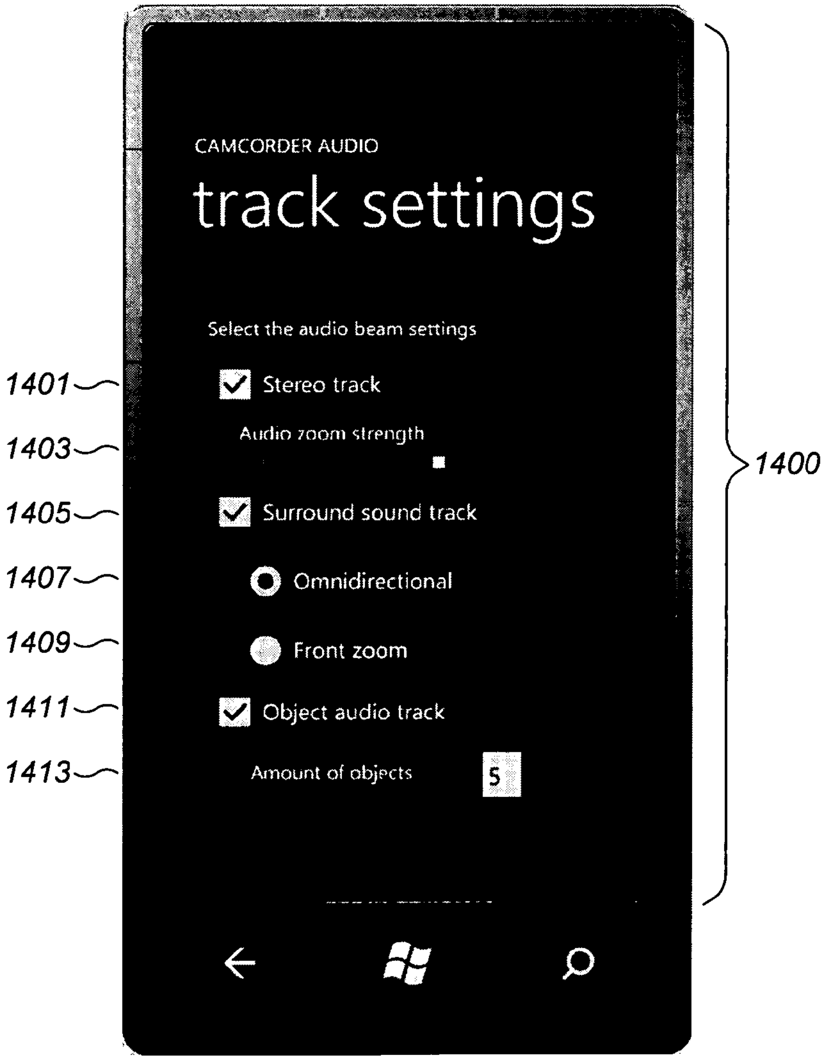
FIG. 15 shows schematically a fifth user interface display configuration for controlling the example spatial audio signal processing apparatus according to some embodiments.

With respect to FIG. 15 a fifth or 'track' user interface 1400 is shown. The track user interface 1400 is configured to enable multiple types of tracks or instances to be generated and control the type of tracks that can be possibly multiplexed onto an output signal. For example as shown in FIG. 15 a stereo instance and option, a surround sound track and options, and object audio track and options are enables to be selected from.

The user interface 1400 comprise a first tick box 1401 labelled stereo track which is configured if selected a stereo processing instance to be generated. Furthermore the settings comprise an audio zoom strength slider 1403 which controls the zoom or gain of the beam pattern applied. It would be understood that in some embodiments further sliders can be implemented to control the selectivity of the 'zoom' or other beam. In other words controlling the width of the beam. Similarly it would be understood that in some embodiments sliders can be associated with other spatially processed beam or focussing operations controlling the effect of the beam or the focussing.

The user interface 1400 further comprises a second tick box 1405 labelled surround sound track which is configured if selected to enable a surround sound processing instance to be generated. Furthermore in some embodiments the user interface 1400 comprises a series of radio button selection options associated with the second tick box which select the type or option of surround sound track processing. For example in FIG. 15 there comprises a first radio button 1407 labelled omnidirectional surround sound and configured if selected and the second tick box is also selected to generate an omnidirectional surround sound or unbiased pattern such as shown in FIG. 16. The list further comprises a second radio button 1409 labelled front zoom and configured if selected and the second tick box is also selected to generate a beamform pattern similar to that shown in FIG. 17.

The user interface 1400 further comprises a third tick box 1411 labelled object audio track which is configured if selected to enable an object processing instance to be generated. Furthermore in some embodiments the user interface 1400 comprises a data entry box or value selection 1413 associated with the third tick box which select the number of objects to be determined within the object audio track processing instance.

It would be understood that the number of instances, types of instance and selection of options for the instances are all possible user interface choices and the examples shown herein are example user interface implementations only.

It shall be appreciated that the term user equipment is intended to cover any suitable type of wireless user equipment, such as mobile telephones, portable data processing devices or portable web browsers, as well as wearable devices.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:

at least one processor; and at least one non-transitory memory including computer code, the at least one non-transitory memory and the computer code configured to, with the at least one processor, cause the apparatus to:

receive from each of at least two microphones of the apparatus at least one audio signal;

generate at least two separate audio tracks each having a different recording type from the at least two audio signals from the at least two microphones; and store the at least two separate audio tracks in a file such that the at least two separate audio tracks represent at least in part audio recordings of a same environment.

2. The apparatus as claimed in claim 1, wherein the respective recording type of each of the at least two separate audio tracks comprises at least one of:

a multichannel audio recording;

a stereo audio recording;

a mono audio recording; and an audio object audio recording.

3. The apparatus as claimed in claim 1, wherein the at least one non-transitory memory and the computer code are configured to, with the at least one processor, cause the apparatus to:

generate at least one combined audio track from the at least two separate audio tracks, wherein the at least one combined audio track is provided with at least one other audio track within the file.

4. The apparatus as claimed in claim 1, wherein the at least one non-transitory memory and the computer code are configured to, with the at least one processor, cause the apparatus to:

encode at least one of the audio tracks, wherein the least one encoded audio track is provided with at least one other audio track within the file.

5. The apparatus as claimed in claim 1, wherein the at least one non-transitory memory and the computer code are configured to, with the at least one processor, cause the apparatus to:

perform processing of the received at least two audio signals prior to generation of the at least two separate audio tracks.

6. The apparatus as claimed in claim 5, wherein the processing comprises at least one of:

equalizing each of the at least two audio signals from the at least two microphones to compensate for any manufacturing differences in the at least two microphones;

reducing the wind noise of the at least two audio signals from the at least two microphones;

reducing the handling noise of the at least two audio signals from the at least two microphones;

dynamic range compression for the at least two audio signals from the at least two microphones;

converting the sampling rate of the at least two audio signals from the at least two microphones;

changing the word length resolution of the at least two audio signals from the at least two microphones; and determining and compensating for a fault or blockage in at least one of the at least two microphones.

7. The apparatus as claimed in claim 1, wherein the generation of the at least two separate audio tracks from the at least two audio signals comprises at least one of:

generation of an audio recording track with more channels than the number of input audio signals;

generation of an audio track with fewer channels than the number of input audio signals;

determination of an orientation of at least one audio signal source relative to the apparatus from the at least two audio signals from the at least two microphones;

modification of an orientation of at least one signal source relative to the apparatus; and mapping the at least two audio signals from the at least two microphones to a multichannel audio track.

8. The apparatus as claimed in claim 1, wherein the generation of the at least two separate audio tracks from the at least two audio signals comprises:

generation of a spatial processing of the at least two audio signals from the at least two microphones.

9. The apparatus as claimed in claim 1, further comprising a camera configured to generate a video format signal, wherein the video format signal represents at least in part a video recording of the same environment as the at least two separate audio tracks, and wherein the video format signal is stored in the file.

10. The apparatus as claimed in claim 1, wherein the file comprises a mp4 format file structure, and wherein the at least two separate audio tracks are linked within the mp4 format file structure.

11. The apparatus as claimed in claim 1, wherein the at least two microphones are configured to generate the at least two audio signals.

12. The apparatus as claimed in claim 1, wherein the generation of the at least two separate audio tracks from the at least two audio signals is based on a user interface input.

13. The apparatus as claimed in claim 12, wherein the user interface input comprises at least one of:

a radio-button selection configured to select one recording type from a plurality of recording types for generation of at least one of the separate audio tracks;

a selection-box selection configured to select one or more recording types from a plurality of recording types for generation of the at least two separate audio tracks;

an audio recording type selection-box selection configured to select one or more audio recording types from a plurality of audio recording types for generation of the at least two audio tracks;

a channel selection configured to select a number of audio channels for generation of at least one of the separate audio track;

an audio region selection configured to determine a spatial region such that generation of at least one of the separate audio tracks comprises application of spatial processing within the determined spatial region;

a surround channel selection configured to select a surround sound recording type, wherein generation of at least one of the separate audio track comprises application of surround sound processing according to the selected surround sound recording type;

a surround channel option selection configured to select one surround sound recording type from a plurality of surround sound recording types, wherein generation of at least one of the separate audio tracks comprises application of surround sound audio processing according to the selected surround sound recording type;

an object recording selection configured to select an object recording type, wherein generation of at least one of the separate audio tracks comprises application of object audio processing based on the selected object; and an object number selection configured to select an object recording type such that generation of at least one of the separate audio tracks is based on a number of audio objects indicated by the object number selection.

14. A method comprising:

receiving from each of at least two microphones of the apparatus at least one audio signal;

generating at least two separate audio tracks each having a different recording type from the at least two audio signals from the at least two microphones; and storing the at least two separate audio recording configurations in a file such that the at least two separate audio recording configurations at least in part represent audio recordings of a same environment.

15. The method as claimed in claim 14, further comprising combining at least two of the audio tracks to generate at least one combined audio track, wherein the at least one combined audio track is provided with at least one other audio track within the file.

16. The method as claimed in claim 14, further comprising encoding at least one of the audio tracks to generate at least one encoded audio track, wherein the at least one encoded audio track is provided with at least one other audio track within the file.

17. The method as claimed in claim 14, further comprising generating a video format signal, wherein the video format signal represents at least in part a video recording of the same environment as the at least two separate audio tracks, and wherein the video format signal is stored in the file.

18. The apparatus as claimed in claim 8, wherein the generation of the spatial processing comprises at least one of:

generation of a spatially focused audio signal from the at least two audio signals from the at least two microphones;

generation of a spatially expanded audio signal from the at least two audio signals from the at least two microphones;

amplification, within a defined directional range, of the at least two audio signals from the at least two microphones;

attenuation, within a defined directional range, of the at least two audio signals from the at least two microphones;

application of a reverberation within a defined directional range to the at least two audio signals from the at least two microphones;

modification of a relative orientation of an audio source by a defined displacement angle; and application of a spatial filter within a defined directional range to the at least two audio signals from the at least two microphones.

19. A computer program product comprising a non-transitory computer-readable medium having program instructions stored thereon, the program instructions executable by a device to cause the device to:

receive from each of at least two microphones at least one audio signal;

generate at least two separate audio tracks from the at least two audio signals from the at least two microphones; and store the at least two separate audio tracks in a file such that the at least two separate audio tracks at least in part represent audio recordings of a same environment.

20. The apparatus of claim 1, wherein the file is stored in the memory of the apparatus.

* * * * *